US011755667B1

(12) United States Patent
Goel et al.

(10) Patent No.: US 11,755,667 B1
(45) Date of Patent: Sep. 12, 2023

(54) EXTRACTION OF RELEVANT CONTENT FROM COMMUNICATION NETWORKS

(71) Applicant: Prove Identity, Inc., New York, NY (US)

(72) Inventors: Amit Goel, Bangalore (IN); Tarun Bansal, Delhi (IN); Aditya Khurjekar, Princeton, NJ (US); Nicolo Petrone, Naples (IT); Mehul Desai, Orlando, FL (US)

(73) Assignee: Prove Identity, Inc., New York, NY (US)

( * ) Notice: Subject to any disclaimer, the term of this patent is extended or adjusted under 35 U.S.C. 154(b) by 2 days.

(21) Appl. No.: 17/680,151

(22) Filed: Feb. 24, 2022

(51) Int. Cl.
| G06F 7/02 | (2006.01) |
| G06F 16/00 | (2019.01) |
| G06F 16/951 | (2019.01) |
| G06F 16/9538 | (2019.01) |
| G06F 16/9532 | (2019.01) |
| G06F 40/205 | (2020.01) |

(52) U.S. Cl.
CPC ........ *G06F 16/951* (2019.01); *G06F 16/9532* (2019.01); *G06F 16/9538* (2019.01); *G06F 40/205* (2020.01)

(58) Field of Classification Search
CPC .............. G06F 16/951; G06F 16/9532; G06F 16/9538; G06F 40/205
See application file for complete search history.

(56) References Cited

U.S. PATENT DOCUMENTS

| 7,159,011 B1 * | 1/2007 | Knight | G06F 16/951 |
| | | | 707/E17.108 |
| 2011/0231382 A1 * | 9/2011 | Xu | G06F 40/295 |
| | | | 707/723 |
| 2020/0410537 A1 * | 12/2020 | Wang | G06F 16/90344 |
| 2022/0147898 A1 * | 5/2022 | Gaurav | G06Q 10/06393 |

* cited by examiner

*Primary Examiner* — Bruce M Moser
(74) *Attorney, Agent, or Firm* — Berkeley Law & Technology Group

(57) ABSTRACT

Briefly, example methods, apparatuses, and/or articles of manufacture may be implemented to receive or obtain, responsive to transmitting the one or more search terms to a search entity, one or more primary content items that include messages that accord with the one or more search terms. The method may additionally include parsing the messages that accord with the one or more search terms to detect one or more relevant secondary search terms and obtaining secondary content items that accord with the one or more relevant secondary search terms. The method may further include generating signals to represent a report of entities that accord with the one or more relevant secondary search terms.

20 Claims, 12 Drawing Sheets

EXTRACTION OF RELEVANT CONTENT FROM COMMUNICATION NETWORKS

BACKGROUND

1. Field

This disclosure relates to one or more computing platforms that may operate to obtain, process, and generate signals representing content extracted from a variety of sources, such as content sources available via the Internet.

2. Information

Many startup businesses seek investment from, or partnerships with, other business entities such as, for example, more experienced business entities, which may include banks of various types (or divisions thereof), professional investors, venture capital funds, private equity funds, and/or the like. It may thus be appreciated that certain business-related entities may be useful to a startup business, for example. However, in a wide variety instances, business entities may provide little or no benefit in the context of a business relationship with a startup business, for example. Along a similar vein, although a bank or investor may seek to invest in, do business with, procure technology from, or otherwise interact with a specific type of startup business, there are many more startup businesses that would not be of interest to a bank or to investor. As such, researching business entities, for example such as to gain understanding of the capabilities of a particular business entity, as well as gaining understanding of the needs and interest of a business entity may represent an important task that can help various interested parties to find relevant relationships and avoid wasting time on irrelevant business entities.

Conventional online hardware and software utilized to determine characteristics and/or aspects of business entities can be unduly time-consuming, so as to require many hours of manual labor, for example, to review dozens, hundreds, thousands, or an even larger number of search results to uncover potentially relevant information with respect to a business and/or third party businesses or their activities. Thus, it may be appreciated that providing tools to enable research on business entities and to connect entities to each other based, at least in part, on their mutual relevance to each other may be, and may continue to be, and active area of investigation.

SUMMARY

One general aspect includes a method including: obtaining, via a user interface, one or more search terms. The method also includes receiving, responsive to transmitting the one or more search terms to a search entity, one or more primary content items that include a plurality of messages that accord with the one or more search terms. The method also includes parsing the plurality of messages that accord with the one or more search terms to detect one or more relevant secondary search terms. The method also includes obtaining secondary content items that accord with the one or more relevant secondary search terms. The method also includes generating signals to represent a report of entities that accord with the one or more relevant secondary search terms.

In particular embodiments, the one or more primary content items correspond to character-limited content items. In particular embodiments, the character-limited content items include content items limited to messages that contain between 100 characters and 400 characters. In particular embodiments, the one or more secondary search terms relate to terms extracted from the messages that contain between 100 characters and 400 characters. In particular embodiments, obtaining the secondary content items is responsive to receiving output signals from a web crawler that operates to detect content items available via the internet. In particular embodiments, the secondary content items are obtained from a real-simple-syndication feed or a news feed. In particular embodiments, the one or more secondary terms correspond to contextual elements of at least one of the plurality of parsed messages from the character-limited publishing application. In particular embodiments, the method may further include normalizing one or more quantities relating to the one or more secondary terms and/or relating to the one or more search terms will Another general aspect may include a computing platform having a processor coupled to at least one memory device to obtain, via a user interface, one or more search terms. The processor coupled to at least one memory device may also receive, responsive to transmitting the one or more search terms to a search entity, one or more primary content items that include a plurality of messages that accord with the one or more search terms. The processor coupled to at least one memory device may also operate to parse the plurality of messages that accord with the one or more search terms to detect one or more relevant secondary search terms. The processor coupled to at least one memory device may also operate to obtain secondary content items that accord with the one or more relevant secondary search terms. The processor coupled to the at least one memory device may also operate to generate signals to represent a report of entities that accord with the one or more relevant secondary search terms.

In particular embodiments, the one or more primary content items correspond to character-limited content items. In particular embodiments, the character-limited content items include content items limited to a plurality of messages that contain between 100 characters and 400 characters. In particular embodiments, the one or more secondary search terms relate to terms extracted from the plurality of messages containing between 100 characters and 400 characters. In particular embodiments, obtaining the secondary content items is responsive to receiving output signals from a web crawler that operates to detect content items available via the internet. In particular embodiments, the secondary content items are obtained from a real-simple-syndication feed or a news feed. In particular embodiments, the one or more secondary terms correspond to contextual elements of at least one of the plurality of parsed messages from the character-limited publishing application. Particular embodiments may include normalizing one or more quantities relating to the one or more secondary terms and/or relating to the one or more search terms.

One general aspect includes an article including: a non-transitory storage medium having instructions stored thereon executable by a special-purpose computing platform to obtain, via a user interface, one or more search terms. The stored instructions may also include instructions to receive, responsive to transmitting the one or more search terms to a search entity, one or more primary content items that include a plurality of messages that accord with the one or more search terms. Stored instructions may also include instructions to parse the plurality of messages that accord with the one or more search terms to detect one or more relevant secondary search terms. Stored instructions may also include instructions to obtain secondary content items that accord with the one or more relevant secondary search terms. The stored instructions may also include instructions to generate signals to represent a report of entities that accord with the one or more relevant secondary search terms.

In particular embodiments, the stored instructions may additionally be to obtain the secondary content items responsive to receiving output signals from a web crawler that operates to detect content items available via the internet. In particular embodiments, the secondary content items may be obtained from a real-simple-syndication feed or a news feed. In particular embodiments, the one or more secondary terms correspond to contextual elements of at least one of the plurality of parsed messages from the character-limited publishing application.

BRIEF DESCRIPTION OF THE DRAWINGS

Claimed subject matter is particularly pointed out and distinctly claimed in the concluding portion of the specification. However, both as to organization and/or method of operation, features, and/or advantages thereof, it may best be understood by reference to the following detailed description if read with the accompanying drawings in which:

Figure 1:
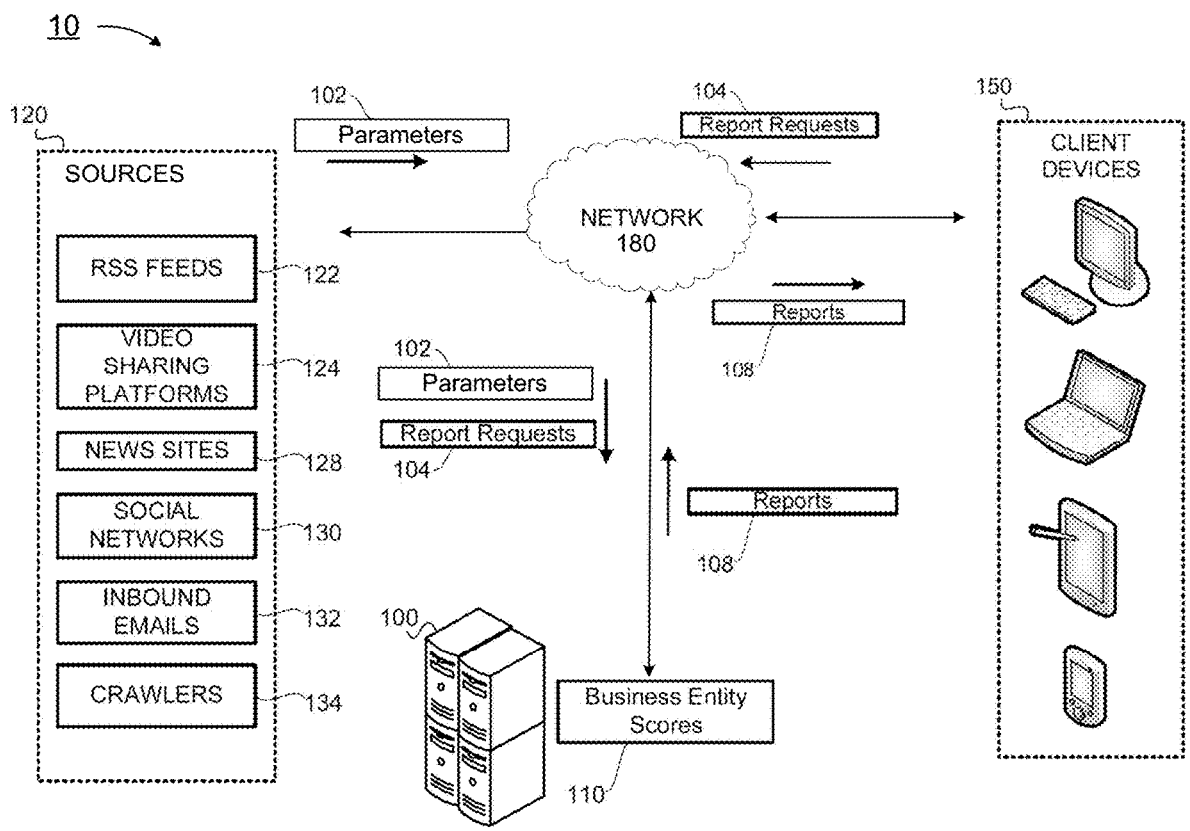
FIG. 1 is a schematic illustrating an example environment of a research system, in accordance with various embodiments.

Reference is made in the following detailed description to the accompanying drawings, which form a part hereof, wherein like numerals may designate like parts throughout that are corresponding and/or analogous. It may be appreciated that figures are not necessarily rendered to scale, such as for simplicity and/or clarity of illustration. For example, dimensions of some aspects may be exaggerated relative to others, one or more aspects, properties, etc. may be omitted, such as for ease of discussion, or the like. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases in various places throughout this specification, are not necessarily intended to refer to the same implementation and/or embodiment or to any one particular implementation and/or embodiment. Furthermore, it is to be understood that particular features, structures, characteristics, and/or the like described, are capable of being combined in various ways in one or more implementations and/or embodiments and, therefore, are within intended claim scope. In general, for the specification of a patent application, these and other issues have a potential to vary in a particular context of usage. In other words, throughout the disclosure, particular context of description and/or usage provides guidance regarding reasonable inferences to be drawn; however, likewise, the term "in this context" in general without further qualification refers at least to the context of the present patent application.

As previously alluded to, at least under certain circumstances, a business may seek investment from, or may seek to partner with, one or more other business entities such as, for example, more experienced business entities, which may include banks of various types (or divisions thereof), professional investors, venture capital funds, private equity funds, and so forth. It may thus be appreciated that certain business-related entities may provide a useful service to, for example, a startup business. However, in a wide variety instances, business entities may provide little or no benefit in the context of a business relationship with a startup business, for example. Along a similar vein, although a bank or investor may seek to invest in, do business with, procure technology from, or otherwise interact with a specific type of startup business, there are many more startup businesses that would not be of interest to a bank or to investor. As such, researching business entities, for example such as to gain understanding of the capabilities of a particular business entity, as well as gaining understanding of the needs and interest of a business entity may represent an important task that can assist various interested parties to find relevant relationships and as well as to avoid wasting time and/or other resources on potentially irrelevant business entities.

Conventional online hardware and software utilized to determine characteristics and/or aspects of business entities can be unduly time-consuming, so as to potentially require many hours of manual labor, for example, to review dozens, hundreds, thousands, or an even larger number of search results to uncover potentially relevant parameters with respect to a business and/or third party businesses or their activities. Thus, it may be appreciated that providing tools to facilitate research with respect to business entities and to connect entities to each other based, at least in part, on their mutual relevance to each other may be, and may continue to be, an active area of investigation.

In the context of the present disclosure, a "communication services carrier" may refer to a mobile communication services provider and/or mobile network operator. However, there are examples of carriers that do not correspond to mobile communicating device services providers and/or mobile network operators. Such instances may include wireline services providers (for example, providers of services operating within the public switched telephone network or PSTN), which include wireline services for rotary-dial telephones and/or telephones utilizing, for example, dual tone multi-frequency (DTMF) signaling. Accordingly, the terms "services carrier" or simply "carrier" may be used in place of a communication services provider and/or wireline telephone services provider without a loss in meaning and/or understanding. In a given situation, particular context of usage should indicate if a term is being used in a general sense or in a narrower sense, such as referring to a mobile communicating device services provider, wireline services provider, mobile paging services provider, and/or mobile network operator, for example.

FIG. 1 illustrates examples of a computer hardware processing environment of research system 10 for extracting relevant content from one or more communications networks according to an embodiment. Operating such computer hardware and/or software processing environments may facilitate identification of instances of mutual relevance among entities, such as business entities, which may facilitate identification of pairs of entities that may wish to interact with one another, such as for investment transactions, technology acquisition, service provision, and so forth. In particular embodiments, research system 10 may include one or more computing devices, which may operate in an individual or distributed manner. Research system 10 may be adapted for automated collection of parameters ("parameters" 102) utilizing one or more different sources 120 of various parameters via a communication network 180. In particular embodiments, the sources 120 may be indicative of predefined sources of various parameters. Sources 120 may include a wide variety of types of parameter sources that may include parameters relevant to a business entity, products and/or services offered by a business entity, relevant activities, relevant interests, interactions between or among other entities, financial status is, and other factors that may determine likely interest in undertaking an interaction with another business. Examples of parameter sources may include, but are not limited to, business websites, business rating sites (credit rating sites, chamber of commerce sites, etc.), RSS feeds 122, video/multimedia sharing platforms 124, electronic news sites 128, social media platforms 130 (e.g., inbound emails from entities 132), parameters obtained from web crawlers 134, and the like. Other sources that are not specifically depicted could include, without limitation, public datasets as offered by various government and private business entities, employment agencies, payroll processors, educational institutions, etc. The collected parameters 102 may be related to a specific industry, such as relating to member businesses within the specific industry. It should be noted that because of the dynamic and complex nature of most technology enabled industries, the member businesses operating in a certain industry might not traditionally be considered as a participant in that specific industry. For example, even though a particular computer hardware and/or software manufacturer may be primarily engaged in a consumer electronics industry, it may also participate in the financial services industry, the music industry, the healthcare industry, etc. which increases the complexity of analyzing the relevance of the hardware and/or software manufacturer in all of the above-identified industries, as well as the relevance of traditional entities in those industries in view of the participation of non-traditional entities in those industries. In implementations, the parameters 102 may relate to participants of various types and at various stages of development in a business ecosystem, market sector or business space (e.g., Fintech, banking, advertising, social media, telecommunications, software, industrial manufacturing, renewable energy, and many others), including without limitation startup businesses (such as technology developers, businesses providing particular goods and services, and others), banks (such as investment banks, merchant banks, consumer banks, and others), investors (such as angel investors, venture capital investors, private equity investors, hedge funds, institutional investors, and others), founders (such as of the startup business), product offerings by startup and other businesses, employees (such as of startup and other businesses, investors, and like), analyst information, and other parameters 102. Parameters 102 may be structured, unstructured, and/or semi-structured. Furthermore, responsive to a business entity seeking to be listed on research system 10, the business entity may be requested to provide parameters relating to the business entity. In implementations, the business entity may provide information indicating a future strategy or plan, a risk assessment, financial parameters, and the like. In implementations, research system 10 may additionally or alternatively implement an artificial intelligence conversational bot (also known as a "chat bot") to collect parameters relating to an entity. For example, a chat bot may ask questions regarding a particular topic, such as whether a business (such as a large bank) is interested in learning more about a particular technology (such as mobile payments technology). In implementations, the conversational bot may be coupled to a speech recognition engine and/or natural language processor that receives audio signals and extracts and/or collects parameters 102 therefrom. In implementations, the conversational bot may include or be supported by a dialog manager that may manage a conversation with a business, such as to solicit answers to a series of questions that collectively provide insight into one or more topics that are of interest to the business.

In implementations, research system 10 may utilize machine learning and/or other artificial intelligence processes to automate the process of collecting, ingesting, cleaning, deduplicating, and/or denoising collected parameters 102. In particular embodiments, research system 10 may structure and index the collected parameters 102. In particular embodiments, research system 10 may structure the collected parameters 102 into entity records that respectfully correspond to a respective entity. In the context of research system 10, an entity record may refer to a record that describes one or more features of a business entity. In implementations, research system 10 may normalize parameters 102, such as based, at least in part, on an understanding how information, such as numerical information, relates to other numerical information that is handled by the research system. For example, ratings about business entities may be found with different scales, such as a 1-5 scale on one rating site and a 1-100 scale on another site, and such ratings may be normalized to provide appropriate weighting to particular items of information. In implementations, normalization may be completed by averaging extracted parameters after normalization, weighted averaging, and the like. In addition to entities noted above and throughout this disclosure, non-limiting examples of a business entity may include, but are not limited to, a startup business, an investor, an influencer, a vendor, a partner, a customer, an incubator, a bank, a venture firm, a private equity firm, an individual professional (e.g., founder, executive, engineer, sales-person), a service provider (such as a law firm, an accounting firm, and the like) and others. Research system 10 may utilize machine-learning and/or other artificial intelligence processes to classify and structure collected parameters 102 into entity records. This may include using pattern recognizers (such as using neural networks), clustering processes (such as self-organizing maps), human trained or human-supervised classifiers, and other machine-learning and artificial intelligence processes to group similarly structured parameters into entity records. In implementations, features relating to different types of business entities may be stored in different types of entity records. In many examples, entity records relating to startup businesses may be structured according to a first schema (such as one that reflects the positioning of a startup technology business in a hierarchy of technologies), while entity records relating to a bank may be structured according to a second schema (such as one that reflects the positioning of the bank based, at least in part, on the type of bank), and entity records relating to an investor may be structured according to a third schema (such as one that indicates the typical stage of investment in which the investor is interested). In other implementations, entity records may all be structured according to a single schema. In particular embodiments, a limited or unverified parameters may be available on small and new business entities. Accordingly, research system 10 may validate, extrapolate or predict gaps in the parameters for sufficiently relevant scoring and assessment for the target business objective. An ability of the system to correct and calibrate the parameter set improves with availability of new parameter, and the confirmation of the system's output with the new inputs received over time. Accordingly, responsive to a new category of business entity emerges in the industry, the system needs to be seeded with assumptive parameter on such new entities, which enables the system to initiate the learning process for automated substantiation of future inputs and entities. Research system 10 may utilize collected parameters 102 to automate research regarding a business entity. In some embodiments, research system 10 may generate various scores relating to an entity based, at least in part, on collected parameters 102. For a given business entity, research system 10 may utilize collected parameters 102 corresponding to the given business entity to determine a score relating to the business entity. In particular embodiments, research system 10 may implement one or more machine-learned scoring models (also referred to as "machine-learned models" or "models") to permit determination of a business entity score 110. A machine-learned scoring model may be any suitable type of scoring model or hybrid models. In some instances, research system 100 may implement a suitable type of regression model (e.g., linear regression, multivariate regression, logarithmic regression).

Figure 4:
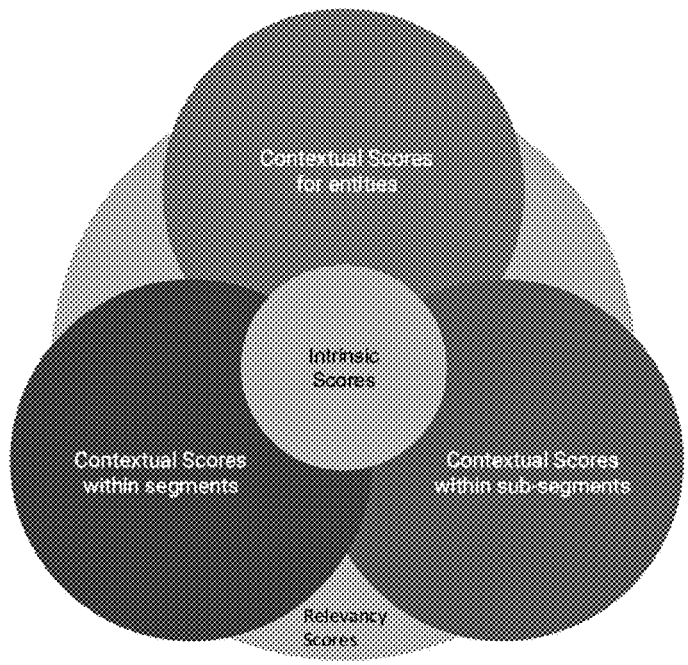
FIG. 4 is a schematic illustrating the overall framework of the system to extract relevant content from one or more communications network, according to an embodiment.
Figure 4:
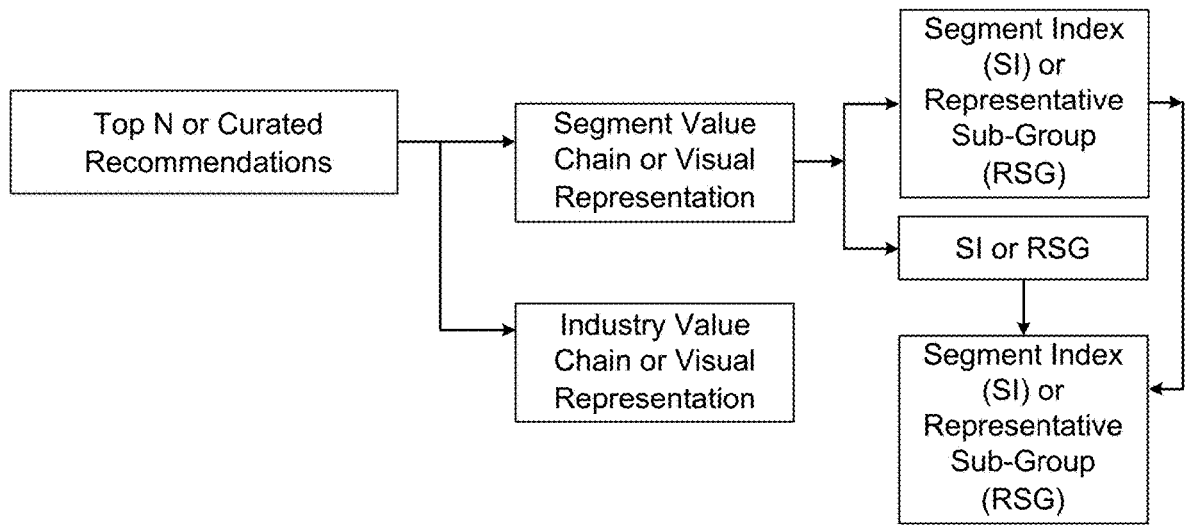

In implementations, the machine-learned models may be trained in a supervised, unsupervised, and/or semi-supervised manner. In some example implementations, a machine learning task may be framed as a semi-supervised learning task, in which a minority of the training parameter (e.g., business entity records) are labeled with human curated scores and the rest are scored automatically, without the benefit of human-generated labels. In particular embodiments, research system 100 may implement different models to determine diverse types of scores. For example, an automated clustering technique (such as a self-organizing map, a k-means technique or a connectivity clustering technique) might be used to group similar business entities into categories, while a pattern recognizing technique (such as a Bayesian technique, a deep learning technique, or the like) might be used to find business entities that closely match a specific topic. In particular embodiments, research system 10 may implement a first computer modeling approach to score startup businesses, a second computer modeling approach to score investors, and a third computer modeling approach to score banks. In some embodiments, a machine-learned scoring model may receive a feature vector that comprises features that relate to a particular business entity. In response to the feature vector, the machine-learned scoring model may, at least in particular embodiments, provide an output signal representing a business entity score 110 relating to the business entity based, at least in part, on one or more features contained in the feature vector. Non-limiting examples of business entity scores 110 include startup scores that relate to startup businesses, investor scores that relate to investors, influencer scores that relate to influencers, bank scores that relate to banking institutions, vendor scores that relate to vendors, partner scores that relate to partners, customer scores that relate to customers, incubator scores that relate to incubators, and individual business professional scores that relate to individual professionals. In particular embodiments, research system 10 may generate a business entity score 110 responsive to structuring an entity record corresponding to the business entity, at the request of a user (e.g., for a report 108), or periodically and/or occasionally to update the entity record corresponding to the business entity. It should be noted that the scores that are generated for entities may include 3 types: intrinsic scores, contextual scores, and relevancy scores, such as shown in FIG. 4 (embodiment 400). Intrinsic scores may indicate a measure of strength or weakness of a business entity and the entity's operations and/or the entity's potential without regard for the strength or potential of other entities. Contextual scores may be derived from intrinsic scores modulated with the additional input of intrinsic or contextual scores of other similar entities in the ecosystem. Relevancy scores are further derived from contextual scores with the additional input of contextual and relevancy scores of other counterparty entities with whom the relevance has to be established. In particular embodiments, a business entity score 110 may indicate a "startup score." Research system 10 may generate startup scores relating to respective startup businesses. In particular embodiments, a startup score may comprise a numerical value to quantify a qualitative aspect or aspects of a startup business. In particular embodiments, a startup score may comprise an indication of an overall health of a startup business. In certain embodiments, a startup score may comprise a general score that is independent of the features or requirements of another entity or set of entities. A startup score may be based, at least in part, on a number of available features of a startup and/or industry related features corresponding to the startup business. Non-limiting examples of features that may be available publicly and used to determine a startup score may include, but are not limited to, the quantitative measure of the startup business's product state, an estimated number of customers, a quantitative measure relating to the startup founders, ratings or other external measurements regarding the startup (such as credit ratings, customer reviews and the like) and quantitative measures of the technology skills of the startup's employees, combinations thereof, or the like. Non-limiting examples of industry related features include, but are not limited to, a quantitative measure of the competition in the industry of the startup business, the average global funding in the industry of the startup business, a quantitative measure of the social media engagement of the startup business in relation to the overall social media engagement of all the businesses in the industry, and the like. The foregoing are only examples of the types of features that may be used to determine a startup score. As discussed further herein, the startup scores of startup businesses operating in a related industry may be used to rank the respective startup businesses with respect to one another, matching a business entity to the startup business, or to generate a formal report relating to a startup business. Research system 10 the address the primary challenge in assessing startups which is related to the lack of accurate and complete reported and verified business information. Accordingly, scoring and rating systems may operate to generate and/or rely on indirect, implied, derived, associated, deduced and assumptive parameter to produce its output, which in turn becomes an input for the system. There are various special considerations for early-stage startups that involve deeper assessment and understanding of the founders and the people involved. Qualifications, reputation, career progression and network of the early startup team, as well as the similar information regarding investors, advisors, and board members are examples of data points that allow for the business parameter to be anticipated for such entities. The startup scores may be derived by the system for such early stage business entities so as to provide an ability for an investor to make an investment decision, or for a professional to decide whether to seek employment or for a prospective customer or partner to engage in a business relationship with the company.

In particular embodiments, a business entity score may correspond to a match score that indicates a degree to which a business entity (e.g., a startup business or a financial institution) matches to the features of a requesting entity given the needs, requirements, and/or preferences of the requesting entity. A match score may be determined based, at least in part, on the feature or requirements of a requesting entity or set of entities, the features of a requesting entity, and features of a candidate business entity. In particular embodiments, a match score may be indicative of, in certain instances, an extent to which information about the startup matches a particular topic (such as indicating that a technology startup is highly linked to a given technology of interest), an extent to which the startup's management team matches one or more parameters or characteristics (such as having experience in given industries, having competencies in particular subjects, having experience with particular companies, or the like), an extent to which the products or services of the startup match a given topic (such as based, at least in part, on keyword analysis, matching to a hierarchy or the like), the extent to which the startup satisfies quality metrics (such as based on ratings, industry feedback, or the like, and others). In some instances, given the dynamic and complex nature of technology-enabled industries, a precise meaning of any data point for an entity may be unique to the context of the specific segment or sub-segment in which that entity operates. The ability of the research system to interpret the entity and assign the appropriate segment or sub-segment to the entity may be valuable in interpreting signals representing data or parameters that is then available or derived for that entity. Thus, a multilayered context architecture may provide for a refined assessment framework to score various entities in a complex industry (such as shown and described in relation to FIG. 4).

In particular embodiments, a business entity score 110 may be, or may be related to, a wide variety of scores or other measures indicative of at least some interests of the business, a financial health of the business, a budget of the business available for investment in technology infrastructure, a history of the business in making investments of a given type, a state of the products, services, or technology infrastructure of the business, and other measures. In particular embodiments, a score may include a "digital readiness score." Research system 10 may be adapted to generate a digital readiness score relating, for example, to a financial entity. A digital readiness score may indicate an extent to which a business entity has adopted one or more known technologies, such as mobile payments technologies, security technologies, encryption technologies, password technologies, single sign-on technologies, mobile applications, conversational agents, Blockchain technologies, online form completion technologies, voice interface technologies, and others. The digital readiness score may be based, at least in part, on a single category of technology or a group comprising one or more technologies. A digital readiness score may be relative to members of a cohort, such as an entire industry, or at least a substantial portion of an industry, or a particular group of similar entities (such as entities of a particular business type, like consumer banks, entities in a given market or location, such as a metropolitan area, entities of a given size, or the like). In particular embodiments, a financial entity may comprise a specific type of business entity. As used herein, a financial entity may include, but is not limited to, a commercial bank, an investment bank, a credit union, an asset management firm, a stock brokerage, an insurance company, a venture capital (VC) firm, a hedge fund, a private equity firm, and the like. A digital readiness score of a financial or other business entity may comprise a measure of the entity's digital readiness to partner with, become a customer of, or otherwise engage with a technology business, such as a Fintech startup business or of the readiness of the entity to provide a comprehensive set of products and services to its own customers, or a combination thereof. For example, a startup business may offer a platform to trade digital currencies. A first financial institution may be a local bank that may be at least partially focused on selling home mortgages, while a second financial institution may be an investment bank that is not risk averse. For the case of the first financial institution, the digital readiness score, responsive to being in the offerings of the digital currency trading startup business, may be relatively low, while the second financial institution may have a relatively high digital readiness score responsive to being compared to other institutions. Such examples of relevancy scores of the various entities in an ecosystem may provide a more nuanced ability for research system 10 to make connections between or among entities. For example, the same entity, even with a high intrinsic score, might give rise to a low relevancy score for one counterparty entity vs another counterparty entity.

In implementations, the readiness score of a financial entity may be based, at least in part, on a set of features relating to a financial entity. Such features may be referred to as "digital readiness index measures." In particular embodiments, a digital readiness index measure relating to a financial or financial services entity may include, but perhaps not limited to, a quantitative measure relating to a financial entity's digital strategy, a quantitative measure relating to the financial entity's customer acquisition channel, a quantitative measure relating to a financial entity's ability and/or willingness to cross-sell and/or upsell, a quantitative measure relating to the financial entity's customer servicing channel, a quantitative measure relating to the financial entity's leadership team, a quantitative measure relating to a financial entity's social media presence, a quantitative measure relating to a financial entity's organizational structure, a quantitative measure relating to the financial entity's future readiness, a quantitative measure relating to a financial entity's information technology strategy, a quantitative measure relating to the financial entity's technology and change management teams, combinations thereof, and the like. In particular embodiments, a digital readiness index measure may be normalized on a common scale (e.g., 1-10). A metric may be quantified in any suitable manner. In implementations, one or more experts may initially provide digital readiness index measures of one or more institutions. In implementations, one or more experts may provide provided measures, along with features of the one or more institutions, which may be used to train respective models that obtain and/or analyze features of an institution and generate a respective digital readiness index measure based, at least in part, on the obtained/analyzed features. As technologies that bring digital readiness to entities evolve overtime, a research system may calibrate the importance on those technologies in assessing their contribution to an entity's digital readiness. This involves domain-specific programming of the system, with technology dependencies and industry use cases mapped out in detail for precise contextual analysis, which bring about an entity's score.

In implementations, a measure relating to a financial entity's digital strategy may be based, at least in part, on an assessment of the entity's digital strategy, strengths, and/or assets, which may be based on an annual performance assessment and, for example, board review of the financial entity, an employee/customer migration strategy from physical to digital channels, combinations thereof, and the like. Certain entities may disclose generic visionary statements about their strategies, so, at least in particular embodiments, a research system may decipher the true differentiation of the entities' strategy by parsing the language in the context of its products, services, and other characteristics based, at least in part, on available and objectively verifiable parameters.

In implementations, a measure relating to a financial entity's customer acquisition channel may be based, at least in part, on an assessment of the entity's customer acquisition efforts through digital channels. In particular embodiments, customer acquisition activities may be determined from, or at least influenced by digital campaigns for on-boarding, a financial entity's turn-around time, the financial entity's verification and/or credit decision processes, combinations thereof, and the like. In particular embodiments, the system may assess effectiveness of existing acquisition channels and improve their impact on customer acquisition via utilization of contextual and relevancy scores to optimize the entity's marketing campaigns.

In implementations, a measure relating to a financial entity's ability and/or willingness to cross-sell and/or upsell may be based, at least in part, on an entity's digital campaign for cross-selling and upselling, its integration with traditional channels, its market share of the digital channel in which a financial entity may cross-sell/upsell, combinations thereof, and the like. Responsive to multiple digital and physical channels being involved, the system is able to determine the appropriate mix of resource allocation towards use of the various channels for requisite marketing spend via those channels based, at least in part, on the metrics and scores generated.

In particular embodiments, a measure relating to the financial entity's customer servicing channel may be based, at least in part, on an assessment of an entity's digital channel for customer service, the entity's customer experience index (e.g., digital v. physical), the entity's manual intervention needed for the digital channel of customer service, combinations thereof, and the like.

In to cover embodiments, a measure relating to the financial entity's leadership may be based, at least in part, on an assessment of the entity's leadership team's digital transformation readiness, whether the entity has a dedicated leader for digital transformation, whether the entity has digital training for top management and board members, combinations thereof, and the like. In particular embodiments, different titles and varying spans of control for such leaders, and some of such leaders might not be dedicated to this activity full time. In particular instances situations, a research system may make assessments based, at least in part, on the direct and indirect information gleaned from public and private sources.

In particular embodiments, a measure relating to the financial entity's social media presence may be based, at least in part, on an assessment of the entity's social media strategy, a presence of an empowered social media team managing an entity's online presence, whether the entity's social media strategy is linked to its business strategy and revenues, combinations thereof, and the like. The system may perform machine learning functions, which may bring about a capability to discern between routine public relations or propaganda and genuine social media engagement that indicates positive feedback from the channel.

In particular embodiments, a measure relating to the financial entity's organizational structure may be based, at least in part, on whether the entity has a presence of a core digital team empowered to manage digital channels, the entity's key performance indicator (KPI) structure, whether the bank has digital training initiatives across its business, whether the entity has a structured approach and strategy to engage with a Fintech business, combinations thereof, and the like. A financial institution may utilize a different nomenclature and a different approach to engaging with startups, and the research system may be capable of determining the level of structure and possibility of deterministic outcomes for a startup to decide whether or how much engage with the financial institution.

In particular embodiments, a measure relating to the financial entity's future readiness may be based, at least in part, on an assessment of the entity's approach towards emerging technologies (e.g., Blockchain, artificial intelligence, machine-learning, and/or robotic process automation), whether the entity has engaged in proof of value and/or proof-of-concept studies regarding newer business models and technologies, whether the entity has engaged in any product/service development with a zero operations approach and multi-channel support, combinations thereof, and the like.

In particular embodiments, a measure relating to the financial entity's data/information management strategy may be based, at least in part, on an assessment of the data/information management capabilities of the entity, a single view of the entity's customer data parameters, whether the entity has rapid innovation cycles, whether the entity employs analytics driven insights, whether the entity has a data monetization strategy, whether the entity has undergone a information security and risk analysis, combinations thereof, and the like.

In implementations, a measure relating to a financial entity's technology and change management teams may be based, at least in part, on an assessment of the entity's initiatives towards upskilling its teams with new technologies, whether the entity has dedicated teams for overseeing the transformation and change management within its organization, combinations thereof, and the like.

It should be noted that the foregoing measures are provided as illustrative examples. No one measure is required, and any combination of measures may be employed. Furthermore, the metrics on which each measure may be based, at least in part, upon are also provided as illustrative examples. No one metric is required, and any combination of the metrics may be employed. In particular embodiments, responsive to input parameters or the derived metrics being imperfect, a research system may be able to determine the most cost-effective way of soliciting, aggregating, validating, correcting, predicting, and/or modulating these metrics to produce an optimal recommendation or score or output for the objective or the business decision. Thus, in particular embodiments, a research system may allow more prudent business decisions to be made even in response to input signals and metrics are imperfect at least partially in response of the intelligence that is offered by the research system.

In implementations, research system 10 may employ a machine-learned scoring model that receives the digital readiness index measures and outputs a digital readiness score. A machine-learned scoring model may be trained in a supervised, unsupervised, or semi-supervised manner. In particular embodiments, research system 10 may implement a regression model (e.g., a linear regression model, a multivariate regression model, a logarithmic regression model, or the like) to generate signals representative of a digital readiness score. In implementations, research system 10 may rank financial entities based on the respective digital readiness scores of the financial entities. In some such embodiments, research system 10 may rank financial entities of the same or similar type with respect to one another. In particular embodiments, banks may be ranked against other banks, while stock brokerages are ranked among other stock brokerages. In implementations, research system 10 may match startup businesses to financial entities based, at least in part, on the requirements of the startup business, the digital readiness scores of the financial entities, and/or one or more of the digital readiness index measures used to determine the digital readiness score. As noted above, digital readiness may be scored based on an overall level of readiness or may be assessed with respect to a particular topic, such as a topic of interest to a particular startup. Thus, for example, a Blockchain technology provider may seek relationships with banks that have low scores for Blockchain adoption but relatively high scores with respect to measures that indicate a readiness to adopt new technologies.

In particular embodiments, research system 10 may be adapted to generate customized entity scores. In these implementations, a user may provide, via a client device (e.g., client devices 150) one or more configuration parameters. Configuration parameters may also define a customized approach to generating business entity score 110. Configuration parameters may define or indicate respective weights that the user wishes to apply to certain factors (e.g., valuing a business's number of customers more than the social media presence of the business responsive to generating a startup score). Configuration parameters may define or indicate features that the user does not wish to utilize in determining the business score (e.g., "do not use an acquisition channel metric to generate the readiness score"). By way of these examples, a user may request the generation of customized reports 108 relating to one or more business entities.

In implementations, research system 10 may be adapted to generate report 108. Report 108 may refer to an electronic document (e.g., a .pdf document, a .json object, an HTML document, a document utilizing any one of several suitable word processing packages, or the like) that contains one or more research content items and/or any other research deliverable. Research system 10 may generate reports 108 in any suitable manner. In implementations, research system 10 may receive report request 104 from client user device 150. Report request 104 may indicate a type of report 108 that is being requested. Examples of types of reports 108 may include ranking reports (e.g., a ranking of "the most interesting startup businesses in the Fintech space"), entity reports (e.g., a detailed research content item pertaining to particular business entity), and match reports (e.g., proposed matches for a business entity to invest in, buy from, or partner with). Depending on the type of the report 108 being requested, report request 104 may include additional types of parameters. In particular embodiments, report request 104 for an entity report may identify the business entity that the user wishes to research. In another example, report request 104 for a match report may indicate the business entity wishing to receive matches and an industry that the business entity seeks to match in (e.g., Fintech or telehealth). In another example, report request 104 for a ranking report may indicate an industry in which the user wishes to view the rankings.

In response to receiving report request 104, research system 10 may generate report 108 based, at least in part, on collected parameters 102 and/or business entity scores 110. Research system 10 may utilize the collected parameters 102, structured parameters that are derived from collected parameters 102, and/or business entity scores 110 of one or more business entities to generate report 108. Research system 10 may utilize machine-learning and/or other AI-based techniques to generate a report 108. Research system 10 may transmit generated report 108 to client user device 150 or to an email account associated with the user. In particular embodiments, responsive to report 108 comprising a format of HTML or a .json object, research system 10 may transmit the report 108 to the client device, which may display the report via a user interface. In another example, responsive to report 108 corresponding to a .pdf or Microsoft Word document, research system 10 may transmit the report 108 to an email address of the user or may make the report 108 available for download.

In particular embodiments, research system 10 provides an opportunity for analysts, experts, and/or aficionados to provide data parameters, help train models, and/or otherwise contribute to research system 10. In some such embodiments, research system 10 may be adapted to issue digital tokens (e.g., cryptocurrency) to these contributors. Research system 10 may be further adapted to accept digital tokens as payment or as prepayment for users of research system 10. In particular embodiments, a token value is related to a value of research system 10. In particular embodiments, there may be different tokens that are provided for different types of contributions, in which the different types of tokens have different values ascribed thereto. In particular embodiments, research system 10 may implement a digital ledger (e.g., Blockchain) to manage the issuance, distribution, and ownership rights of the digital tokens.

In particular embodiments, research system 10 may be adapted to generate media content items relating to a business entity or group of business entities based, at least in part, on the research performed by research system 10. In certain embodiments, research system 10 may implement machine-learning and/or other AI-based techniques to determine a topic of a media content item, a format of the media content item, a type of the media content item, a relevance of the media content item, and/or a delivery medium of the media content item. In an example, the research system may identify a topic relating to "Blockchain in the lending domain" as being a trending topic. Based on an analysis of collected parameters 102, research system 10 may recommend a blog post or article on the topic. Finally, based, at least in part, on analysis of the types of consumers that are interested in the topic, research system 10 may recommend one or more of an article, a newsletter, a social media post, or the like as an effective medium for the content item. Research system 10 may be further adapted to implement machine-learning and/or other AI-based techniques to generate the media content item. This may include determining one or more features relating to a business entity and including the features (or text or values relating to the features) in a media content item. In some embodiments, research system 10 may implement an AI-based, at least in part, conversational bot to receive information to include in the automatically generated (e.g., generated without human input) media content item. In particular embodiments, research system 10 may be adapted to implement program management relating to an innovation project. In these implementations, an entity (e.g., an accelerator or incubator) may customize its programs based, at least in part, on the entity's workflow and/or criteria. The automated research module may provide a complete end-to-end innovation program management for a particular entity. The entity may interact with research system 10 to customize the program. In particular embodiments, research system 10 may be adapted to plan and execute events (e.g., panel discussions, tutorials, speaking engagements, informational sessions, meetups, and the like). The events may be hosted at a physical location or in a virtual setting. In these implementations, research system 10 may implement machine-learning and/or other AI-based techniques to determine a list of one or more event topics that may be discussed or presented during the event. Research system 10 may a list of recommended sponsors for the event based, at least in part, on the one or more event topics, a list of recommended speakers to speak at the event based, at least in part, on the one or more event topics, a list of recommended event venues, combinations thereof, and the like.

In particular embodiments, research system 10 may be adapted to match individual professionals to potential employers. In these implementations, the research system may receive a request for potential employers from a user that is an individual professional via client device 150 of the user. The request may indicate one or more professional requirements of the individual professional. Research system 10 may identify potential employers for the employee based, at least in part on the professional requirements, the business entity scores 110 of the potential employers, features relating to the potential employers, combinations thereof, and the like.

In particular embodiments, research system 10 may be adapted to match employers to potential employees that are indexed in research system 10 as individual professionals. In these particular embodiments, research system may receive a request for potential employees from a user that is affiliated with a business entity (e.g., a startup business) via the client device 150 of the user. A request may indicate one or more employer requirements of the business entity. Research system 10 may identify potential employees for the business entity based, at least in part, on the employer requirements, individual professional scores of potential employees, features relating to the potential employees, combinations thereof, and the like.

In particular embodiments, research system 10 may be adapted to include an education platform that provides instruction and/or tutorials relating to a specific industry or topic. Research system 10 may be adapted to provide learning content that includes the instruction or tutorials. In particular embodiments, research system 10 may implement a passive-learning model, in which a user may use a micro-learning mobile application at his/her convenience. In particular embodiments, research system 10 may implement machine-learning and/or other AI-based techniques to derive the learned content.

In particular embodiments, research system 10 may implement one or more application programming interfaces (APIs) to communicate with parameter sources 120 and/or client devices 150. A first API may be adapted to allow parameter sources 120 to actively provide collected parameters 102 to research system 10. The first API may define a manner by which a parameter source 120 may package the collected parameters 102 and/or communicate the collected parameters 102 to research system 10. A second API may be adapted to allow client device 150 to request reports 104 relating to an entity. A second API may define a manner by which client device 150 issues a report request and a mechanism by which the client device 150 may receive report 108. In implementations, the second API may allow a business entity, such as a bank or consultancy, to integrate reports 108 into their respective software systems. For example, a bank or consultancy may integrate reports into their own research platforms, so as to permit employees to issue report requests 104 and receive reports 108 without having full access to research system 10.

Figure 2A:
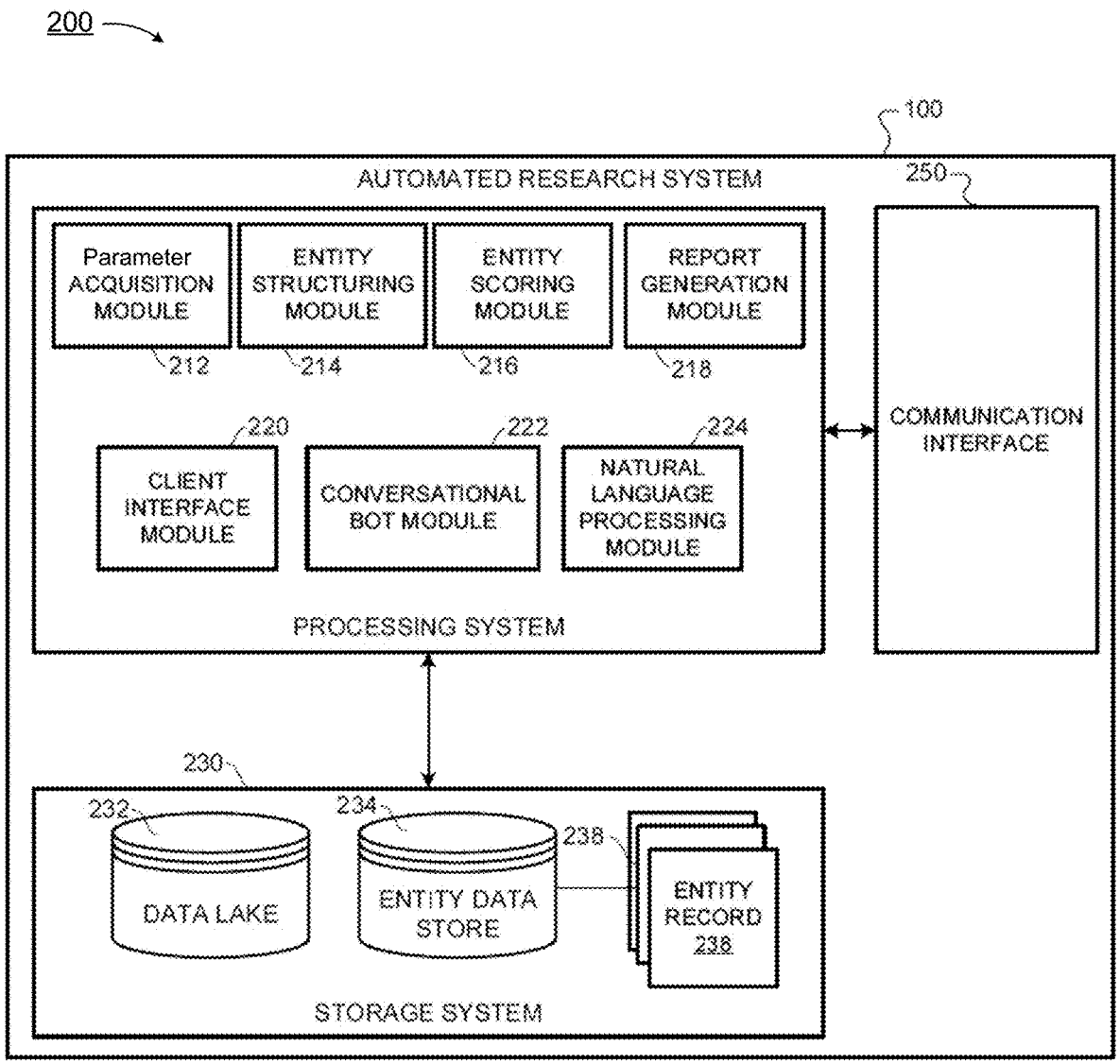
FIG. 2A is a schematic illustrating an example set of components of a research system, according to an embodiment.

FIG. 2A illustrates an example set of components of research system 10, according to an embodiment. Research system 10 may include processing system 200, storage system 230, and communication interface 250. Assessing system 200 may include memory (e.g., RAM and/or ROM) to store computer-readable instructions and one or more hardware processors that execute the computer readable instructions. In particular embodiments in which processing system 200 includes more than one processor, the processors may operate in an stand-alone or distributed processing manner. Furthermore, in particular embodiments the two or more processors may be located within the same computing device or may be implemented in separate computing devices (e.g., rack-mounted servers at one or more physical locations). Processing system 200 may execute parameter acquisition module 212, entity structuring module 214, entity scoring module 216, report generation module 218, client interface module 220, conversational bot module 222, and natural language processing (NLP) module 224. Processing system 200 may execute additional components not shown.

Communication interface 250 includes one or more devices that may perform wired or wireless (e.g., WiFi or cellular) communication. Examples of communication interface 250 include, but are not limited to, a transceiver adapted to perform communications using the IEEE 802.11 wireless standard, an Ethernet port, a wireless transmitter, and a universal serial bus (USB) port. Storage system 230 may include one or more computer readable storage mediums (e.g., hard disk drives and/or flash memory drives). Storage media may be located at the same physical location or at different physical locations (e.g., different servers and/or different data centers). Storage system 230 may store one or more of data lake 232 and entity datastore 234. Data lake 232 may comprise a vast storage repository that stores raw parameters. Parameters stored in data lake 232 may be structured, unstructured, and/or semi-structured. Data lake 232 may be populated with collected parameters 102 obtained by parameter acquisition module 212. In particular embodiments, data lake 232 is a Hadoop data lake.

Figure 2B:
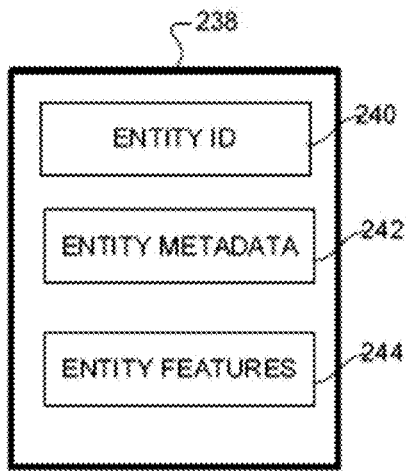
FIG. 2B is a schematic illustrating an example entity record, according to an embodiment.

In particular embodiments, entity datastore 234 may store entity records 238. Entity records 238 may comprise electronic records, which define one or more features of a business entity. FIG. 2B (embodiment 201) illustrates an example of entity record 238. In the example, entity record 238 may include entity identifier 240 that uniquely identifies a business entity, entity metadata 242, and entity features 244. Depending on the type of business entity, entity record 238 may store different types of metadata 242 and features 244. In particular embodiments, entity records relating to startup businesses may be structured according to a first schema, while entity records relating to a bank may be structured according to a second schema. In certain embodiments, entity records may be structured according to schemas (or perhaps even a single schema) that includes different types of metadata 242 and features 244, in which some fields are left unpopulated depending on a business entity type.

In particular embodiments, entity metadata 242 may include any metadata or parameters that describe or otherwise relate to a business entity. Examples of entity metadata 242 may include a name of the business entity, a location of the business entity, references to entity records of other business entities that may be related to the entity (e.g., investors, founders, owned entities, etc.), and any other appropriate parameters. In particular embodiments, for a startup business, entity metadata 242 may include a name of the startup business, an address of the startup business, a state in which the startup business is incorporated, an organizational structure of the startup business, references to entity records 238 of the founders of the startup business, references to entity records 238 of the investors of the startup business, references to entity records 238 of the startup businesses commercial products, and the like.

In particular embodiments, entity features 244 may comprise quantitative measures that describe or otherwise relate to an aspect of a business entity. Entity features may be explicitly provided in collected parameters 102 obtained by the parameter acquisition module 212 or may be derived, deduced, inferred, interpolated, or otherwise determined from collected parameters 102. Entity features may vary depending on the type of entity. In implementations, for a startup business entity, entity features 244 that are stored in a entity record 238 may include, but are not limited to, a product state feature, which may include a quantitative measure of the startup business's product state, a customer feature that may include an estimated number of customers of the startup business, a founder feature that may include a quantitative measure relating to the startup business's founders, a skills feature that may include a quantitative measure of the technology skills of the startup business's employees, a competition feature, which may relate to a quantitative measure of the competition in the industry of the startup business, a funding feature that may include the average global funding in the industry of the startup business, a social media feature that may include a quantitative measure of the social media engagement of the startup business in relation to the overall social media engagement of all the businesses in the industry, a technology feature indicative of the nature of the technology provided by the startup business entity, one or more other features noted throughout this disclosure, as well as combinations and permutations thereof, and the like.

Figure 2C:
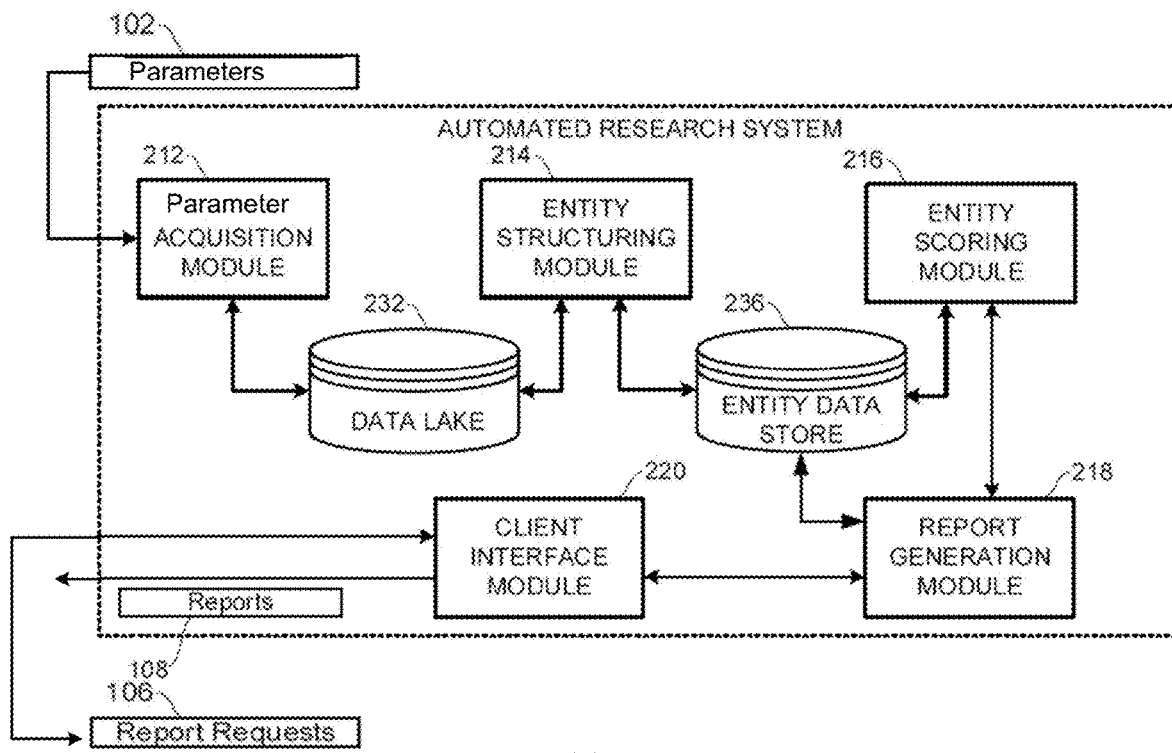
FIG. 2C is a schematic illustrating example processing pipeline of a research system, including a manner by which a research system may collect, structure, and score business-related parameters as well as illustrating a manner by which the research system may operate to generate structured output signals, according to an embodiment.

FIG. 2C illustrates example processes of research system 10, according to an embodiment. The embodiment of FIG. 2C may include Including a manner by which research system 10 may collect, structure, and score collected parameters 102 and a manner by which research system 10 may generate automated reports 108. In the illustrated examples, the parameter acquisition module 212 may be adapted to obtain parameters (e.g., collected parameters 102 of FIG. 1) from a set of parameter sources 120. Parameters may be structured, unstructured, and/or semi-structured. Parameter acquisition module 212 may obtain parameters passively and/or actively. In implementations, parameter source 120 may provide parameters to the parameter acquisition module 212. In particular embodiments, parameter source 120 may utilize an API to communicate parameters to the parameter acquisition module 212 via communication network 180. In another example, a user affiliated with a business entity may provide parameters pertaining to the business entity to parameter acquisition module 212. In particular embodiments, the user may upload parameters to a portal, annunciate parameters to a conversational bot, and/or email parameters (e.g., answers to a questionnaire) to an account accessible by parameter acquisition module 212. In implementations, parameter acquisition module 212 operates to collect parameters actively. In particular embodiments, parameter acquisition module 212 may implement one or more web crawlers that crawl among one or more predefined a parameter sources. In particular embodiments, parameter acquisition module 212 may utilize a list of business entities from which the acquisition module is to collect parameters. Parameter acquisition module 212 may implement a plurality of crawlers to crawl the predefined parameter sources 120 so as to search for documents (e.g., webpages) that include terms relating to a business entity (e.g., the name of the business entity). Upon identifying documents that contain one or more of the terms, parameter acquisition module 212 may retrieve the documents for inclusion in the data lake 232.

In particular embodiments, parameter acquisition module 212 may deposit any collected parameters into data lake 232. As previously mentioned, data lake 232 may comprise a Hadoop data lake 232. Entity structuring module 214 may structure collected parameters in the data lake 232. In particular embodiments, entity structuring module 214 may generate entity records 238 and updated entity records 238 based, at least in part, on the structured data. Entity structuring module 214 may structure the data in the data lake in any suitable manner. In particular embodiments, entity structuring module 214 may employ clustering algorithms (e.g., k-means clustering) to cluster collected parameters 102. Entity structuring module 214 may utilize a list of business entities to better cluster collected parameters. Entity structuring module 214 may also implement suitable data mining/ feature extraction techniques to extract relevant metadata and features pertaining to a particular business entity. For a business entity, entity structuring module 214 may generate a new entity record 238 corresponding to the business entity utilizing, in particular embodiments, an entity record template. Entity structuring module 214 may assign new unique identifier 240 to entity record 238. Entity structuring module 214 may populate fields of a new entity record using extracted parameters. Entity structuring module 214 may store newly generated entity record 238 in the entity datastore 234. In updating a previously stored entity record 238, entity structuring module 214 may write any newly extracted parameters to the previously generated entity record 238.

Entity scoring module 216 may be adapted to score a business entity based, at least in part, on one or more features of a business entity. In particular embodiments, entity scoring module 216 may implement one or more machine-learned scoring models to determine business entity score 110 of a business entity. A machine-learned scoring model may be any suitable type of scoring model. In particular embodiments, entity scoring module 216 may implement a regression model (e.g., a linear regression model, a multivariate regression model, a logarithmic regression model, or the like). In particular embodiments, research system 10 may implement different models to determine different types of business entity scores 110 for different types of business entities. For instance, research system 10 may implement a first model to score startup businesses, a second model to score investors, a third model to score banks, and so on and so forth.

In particular embodiments, entity scoring module 216 may retrieve entity record 238 of a business entity to be scored. Entity scoring module 216 may generate a feature vector based on features 244 contained in entity record 238. In particular embodiments, in generating a startup score of a startup business, entity scoring module 216 may generate a feature vector that comprises contains the startup business's product state feature, customer feature, founder feature skills feature, competition feature, funding feature, technology feature and/or social media feature. Entity scoring module 216 may feed the feature vector to the machine-learned scoring model. In response to the feature vector, the machine-learned scoring model outputs a business entity score 110 relating to a business entity. For example, the machine-learned scoring model may generate an output signal representing a startup score of the startup business in response to the feature vector defining the features of the startup business. Entity scoring module 216 may generate other suitable business entity scores 110, such as investor scores, influencer scores, bank scores, vendor scores, partner scores, customer scores, incubator scores, individual business professional scores, and digital readiness scores. In particular embodiments, entity scoring module 216 may generate a determined business entity score 110 of a business entity to entity record 238 of the business entity. Entity scoring module 216 may generate a business entity score 110 of a business entity responsive to structuring an entity record 238 corresponding to the business entity, in response to a report request 104, or periodically update the entity record 238 corresponding to the business entity. Report generation module 218 may be adapted to generate reports 108 relating to one or more business entities. Examples of reports 108 include, but are not limited to, ranking reports (e.g., "a ranking of the most interesting startup businesses in the Fintech space"), entity reports (e.g., a detailed research content item pertaining to particular business entity), and match reports (e.g., proposed matches for a business entity). Report generation module 218 may generate report 108 in response to report request 104. In operation, client interface module 220 may receive report request 104 from a user device associated with a user. Report request 104 may indicate a type of report 108 that has been requested. Depending on the type of report 108 being requested, report request 104 may include additional types of parameters. In particular embodiments, report request 104 for an entity report may identify the business entity that the user wishes to research. In another example, report request 104 for a match report may indicate the business entity wishing to receive matches and an industry that the business entity wants to match in (e.g., Fintech or telehealth). In another example, report request 104 for a ranking report may indicate an industry in which the user wishes to view the rankings. In response to receiving the report request 104, the client interface module 220 passes report request 104 to report generation module 218.

In response to receiving report request 104, report generation module 218 generates a report based, at least in part, on the business entity scores 110 and/or the entity records 238 implicated by the request. Report generation module 218 may utilize machine-learning and/or other AI-based techniques to generate report 108. In particular embodiments, report generation module 218 may identify certain ones of entity records 238 that may be relevant to report request 104. Report generation module 218 may also retrieve a report template that may be adapted to generate a particular type of report 108. For instance, report generation module 218 may utilize an entity report template to generate an entity report or a match report template to generate a match report. Report generation module 218 may then determine relevant metadata 242 and/or features 244 of one or more business entities to include in report 108. The report generation module 218 may then insert determined data into the report template to generate a report. Report generation module 218 may be further adapted to perform tasks that are specific to the type of report. In particular embodiments, report generation module 218 may be adapted to rank business entities based, at least in part, on their respective business entities scores. In another example, the report generation module 218 may be adapted to identify matches between two different types of business entities based, at least in part, on the respective business entity scores 110 and the requirements of the respective business entities. In implementations, report generation module 218 generates match reports. A match report may be a report that indicates a list of one or more business entities that best fit for a particular entity (e.g., a requesting entity) for a particular purpose (e.g., a type of business relationship) in view of respective needs of a particular entity and the features of candidate entities and features of the particular entity.

In particular embodiments, a requesting entity may provide one or more needs and/or requirements for an ideal match. For example, a requesting entity may correspond to a grocery chain looking to add invoicing software to a technology stack. A user may indicate the locations of the grocery chain, that the grocery chain is not a tech-savvy business (meaning the grocery chain is at least occasionally in need of technical support), and other needs or requirements of the grocery chain. In response to the features of the requesting entity (e.g., the grocery chain), as well as the needs, requirements, and/or preferences of a requesting entity (e.g., the grocery chain), report generation module 218 may identify a list of startup businesses that may match the requesting entity. In particular embodiments, generation module 218 may identify a preliminary list of businesses that offer the services, features, or attributes that a requesting entity is searching for (e.g., invoicing software for retail stores). Hence, for businesses listed in a preliminary list, entity scoring module 214 may generate a match score for each business in the preliminary list. In particular embodiments, a match score may comprise an entity score of a particular entity with respect to a requesting entity (e.g., scores of invoicing software providers with respect to the grocery chain). Entity scoring module 214 may utilize features or attributes of a business as well as features and needs/requirements/preferences of a requesting entity. In implementations, entity scoring module 214 may generate input signals corresponding to features of a business as well as features of a requesting entity and needs/requirements/ preferences of a requesting entity into a scoring model. A scoring model may provide output signals representing a match score of the business entity. Entity scoring module 214 may determine a match score for respective entities in a preliminary list of entities. The report generation module 218 may then rank the business entities in a preliminary list of entities based, at least in part, on the respective match scores thereof. Report generation module 218 may, in response, identify one or more business entities that match to the requesting entity from the ranked list of entities. Report generation module 218 may, in response, generate a report comprising identified business entities. A report may indicate the names of the match entities, the features of the identified entities, and/or match scores of the identified entities.

Client interface module 220 may transmit generated report 108 to the client user device 150 or to an email account associated with a user. In particular embodiments, responsive to report 108 comprising an HTML or .json object, for example, client interface module 220 may transmit report 108 to a client device, which may display report 108 via a user interface. In another example, responsive to report 108 comprising a .pdf or Microsoft Word document, client interface module 220 may transmit the report 108 to an email address of the user or may make the report available for download. In particular embodiments, entity scoring module 216 may use business entity scores 110 assigned to various startups hereinafter referred to as "startup scores" to develop investment instruments including an index fund and offer investors to invest in such an instrument. The index fund may automatically (e.g., without user input) select startups with the highest startup scores as determined by entity scoring module 216 and include securities issued by the selected startups to create an investible portfolio. An index fund comprising select startups allows investors to gain access to the best ranked startup businesses as determined by expert due diligence of research system 10.

An index fund is a collective investment instrument may obtain money from multiple investors and invests that money in a plurality of securities representing ownership interest in a business. These securities may include, but are not limited to, stocks, bonds, and/or money market instruments. In particular embodiments, the different startup securities may be weighted equally in an index fund while in other implementations the securities may be price-weighted. Referring back to FIG. 2A, in implementations research system 10 may include conversational bot module 222 and natural language processing (NLP) module 224. Conversational bot module 222 may be adapted to engage in a conversation with a human to obtain collected parameters 102. In implementations, conversational bot module 222 may employ one or more scripts that module 222 may utilize to obtain collected information from a human user. For example, responsive to conversational bot module 222 initiating a conversation with a founder of a startup business, conversational bot module 222 may retrieve and begin the conversation utilizing a script that is designed to elicit answers relating to the startup founders, the startup business, the startup business's products, the startup business's investors, and the like. In another example, responsive to conversational bot module 222 initiating a conversation with an investor, conversational bot module 222 may retrieve a script that is designed to elicit answers relating to the investor, companies that the investor has invested in, technology areas that are trending, and the like. Conversational bot module 222 may be further adapted to employ an AI and/or rules-based approach to determine follow up questions during the conversation. To initiate a conversation, conversational bot module 222 may utilize any suitable communication means to initiate a conversation. For example, conversational bot module 222 may utilize a text-based chat portal or a telephone call to have a conversation. As the human provides answers, the conversational bot may operate to collect conversation parameters. Conversation parameters may comprise text or audio, depending on the communication medium utilized to conduct the conversation. In implementations responsive to the conversation medium being telephonic (or other audio-based mediums), conversational bot module 222 may employ speech-to-text algorithms to convert the conversation data to text.

The conversational bot module 222 is adapted to pass conversation data to NLP module 224. NLP module 224 may receive the conversation data and may determine a meaning of the received conversation data. NLP module 224 may utilize one or more questions asked by conversational bot module 222 as context to determine the meaning of the human's response to a question. NLP module 224 may implement one or more suitable NLP algorithms to process the human speech. The NLP module 224 may respond to conversational bot module 222 with a construction (or possible construction) of human speech. Conversational bot module 222 may, in turn, use the construction to determine what questions to ask the human next.

In particular embodiments, conversational bot module 222 collects conversation data and NLP module 224 processes conversation parameters. In particular embodiments, conversational bot 222 and/or the NLP module 224 may store the conversation data to the data lake 232. The conversation parameters may include the contents of the conversation, as well as information relating to the conversation. The information relating to the conversation may include, but is not limited to, the name of the human being interviewed, the date of the interview, and/or the script used during the interview. In implementations, the data structuring module 214 may structure the conversation data with the rest of the collected parameters 102. Research system 10 of FIGS. 2A-2C may include additional components not shown.

In certain embodiments, research system 10 may be implemented as a decentralized network for connecting various business entities in a business ecosystem (e.g., Fintech, banking, advertising, social media, telecommunications, software, industrial manufacturing, renewable energy, and many others), and allowing for collaboration and partnerships between such business entities. In particular embodiments, research system 10 may implement a digital ledger (e.g., Blockchain) to manage the issuance, distribution, and/or ownership rights of digital tokens. Digital tokens may be utilized as a utility metric for participation of different business entities within the ecosystem and may be used as payment credits to incentivize participation and good behavior by such entities. For example, research system 10 may issue tokens to incentivize influencers and experts for their insights into specific subjects, analysts for helping train models, professionals for providing data parameters, and all users for consistent logins and inviting other entities to participate in the ecosystem. Digital tokens may then be exchanged by these entities for benefits within the ecosystem including but not limited to availing premium services from service providers, placing advertisements targeted towards other entities of interest, buying reports from research system 10 and so on. In particular embodiments, value of the digital token is related to the value of decentralized network representing research system 10.

Figure 3:
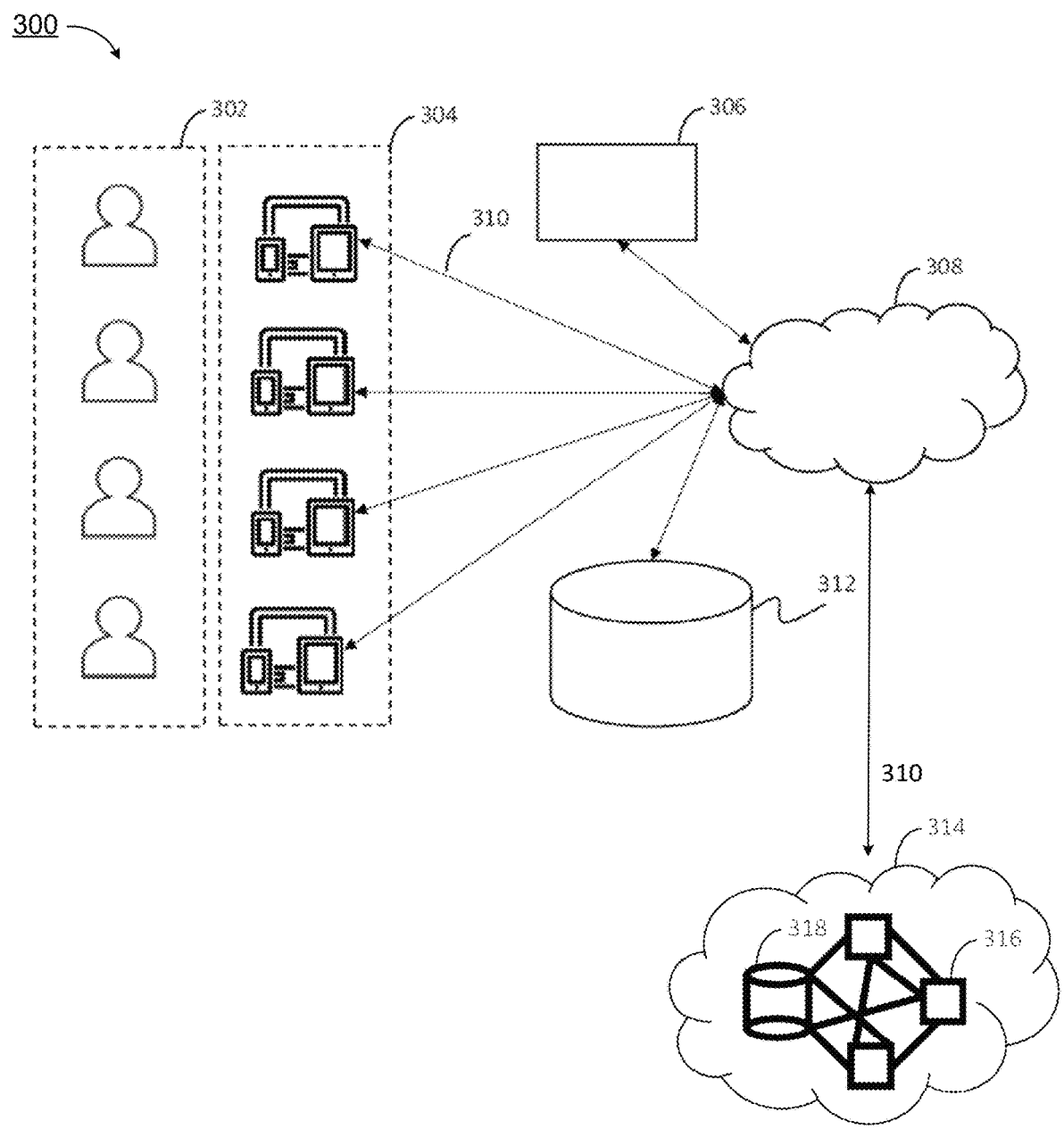
FIG. 3 is a schematic illustrating example system of decentralized research system including a blockchain network having one or more nodes that may be in communication with one or more client devices or servers of the system, according to an embodiment.

FIG. 3 is a schematic diagram showing example system 300 including various entities that enable a decentralized research system 10, according to an embodiment. System 300 is adapted to facilitate communication of parameters and information to and from one or more users 302, through their respective client devices 304 and servers 306 via data network 308 through network connection 310. Users 302 may include various business entities such as a startup business, an investor, an influencer, a vendor, a partner, a customer, an incubator, a bank, a venture firm, a private equity firm, an individual professional (e.g., founder, executive, engineer, sales-person), a service provider (such as a law firm, an accounting firm, and the like) or the like. Client devices 304 can be any type of computing device, such as smartphones, laptops, desktops, tablet computers, personal digital assistants, wearables or the like. Data network 308 may be of any suitable type, including but not limited to local area networks (LANs), wide area networks (WANs), proprietary networks, open networks, wired networks, Ethernet, wireless networks, the Internet, combinations thereof, and may be adapted to carry data, information, messages, or the like, such as in the form of data packets (e.g., encapsulated packets comprising parameters) between client devices 304 and servers 306, using any suitable protocol, such as TCP/IP. Data store 312 may contain one or more databases storing data related to various users including research reports. Client devices 304 may be adapted to download and or install one or more applications (decentralized application or Dapp) that allow user 302 to access and manage decentralized research system 300. In particular embodiments, system 300 may include a blockchain network 314, having one or more nodes 316, which may be in communication with one or more client devices 304 or servers 306 of the system 300. Node 316 may comprise client device 304, server 306 or may comprise any other suitable networked computing platform. Block chain network 314 may manage a distributed blockchain database 318 containing data related to users 302 of the system 300. In implementations, system 300 may be adapted to manage information distributed across various nodes, in which each node may execute one or more algorithms to verify authenticity of elements to be added to blockchain network 314. Parameters of a block chain may be maintained as a continuously growing ledger, which may be referred to as blocks, secured from tampering and revision. Each block may comprise a timestamp and a link to a previous block. Consensus may be utilized to ensure that the shared ledgers correspond to exact copies of one another, and lowers the risk of fraudulent transactions, because tampering would have to occur simultaneously across many places. Cryptographic hashes, such as the SHA256 computational algorithm, may be used to ensure that an alteration to transaction data input results in a different hash value being computed, which may indicate a potentially compromised transaction input. Digital signatures may be utilized to ensure that any data added to blockchain database 318 is signed with private keys of users thereby reducing the propensity of imposters or other security issues. It will be appreciated in light of the disclosure that blockchain database 318 may record the chronological order of data entry transactions with all nodes 316 agreeing to the validity of data transactions using the chosen consensus model. The result may be data transactions that are irreversible and agreed to by all members in the blockchain network 314. It should be noted that blockchain network 314 may be of a permissioned variety (e.g., it may include only pre-sanctioned peer nodes) or non-permissioned variety. For the permissioned type, there may be a mechanism by which new prospective peer nodes are to be approved via a governance process prior to the new node being added to conduct transactions on blockchain network 314. This may entail a variety of methods, such as voting among peer nodes to determine which candidates should be admitted into blockchain network 314.

In particular embodiments, blockchain network 314 may be based, at least in part, on a cryptocurrency and/or blockchain database 318 may be implemented using interplanetary file system (IF'S). Different users 302 interacting over blockchain network 314 may maintain a public identity and associated private credentials or keys may be retained in a blockchain wallet. The wallet may also be used by users 302 to hold the digital tokens issued by network 314 for contributions made to the network. Such decentralized implementation of the research system may help improve the quality of parameters, such as collected parameters, by inviting contributions from an entire community of users 302 and awarding all users 302 showing active participation through the digital token. Such incentivization by tokens enables transactions between different users 302 and may help kindle greater engagement and interaction in the user community. Users 302 may utilize the digital tokens for various transactions within the network. For example, a venture capital firm may use tokens for buying research reports related to a start-up in a vertical of interest. Similarly, a start-up company may use tokens to buy legal services from law firms within the network.

In exemplary implementations, digital tokens may include an open source virtual currency as the source of value that may incorporate cryptography as a mechanism to secure units of value or transactions. Cryptography and other mechanisms may also be incorporated with respect to minting of new incentive units or creation of value, e.g., via mining, proof-of-stake, proof-of-work, consensus, permissioned consensus, or other suitable protocol schemes, which may be performed by a community of users. In implementations, tokens may be purchased (for example, at an exchange), sold for goods or services, traded and exchanged for different currencies like US dollar, EU euro, or cryptocurrencies. In implementations, the value of the tokens relates to the value of decentralized network of business entities representing research system 10.

In particular embodiments, digital tokens may be recorded on the blockchain and transferred using smart contracts. Such smart contracts may be self-executed between system 300 and users 302 and also between different users 302 in blockchain network 314. Thus, for example, responsive to user 302 contributing to blockchain network 314 by referring five other users and providing research insights, tokens may be issued through smart contracts and added to the wallet of user 302. Similarly, a smart contract may be used to transfer the escrowed payment of digital tokens between advertisers and viewers of advertisement within blockchain network 314.

In various implementations, smart contracts may be used to implement a secure and transparent self-managing token based, at least in part, transactions between users 302 within blockchain network 314 in real time or near real time without requiring any intermediaries. Users 302 may perform one or more actions that provide input to the smart contract. For example, such actions may include scanning readable indicia (such as a barcode or Quick Response (QR) code), entering a redemption code, purchasing research reports, viewing advertisements from other users in the network or the like. This action may be processed using the public key of the user and the resulting encrypted action information is input into the smart contract. The smart contract may use embedded logic to decrypt the encrypted action information and upon determining validity based, at least in part, on the terms specified in the smart contract. The smart contract may automatically (e.g., without user input) to deliver specified tokens to the user in a wallet. The smart contract may provide the transactional amount, users involved, and timing of payment of tokens. In implementations, the tokens may be based, at least in part, on any suitable cryptocurrency system, which may correspond to an open source, blockchain-based distributed computing platform utilizing smart contracts. In particular embodiments, the decentralized implementation of research system 10 may be used to enable decentralized marketplaces for goods and services for business verticals including fintech, tele-health or the like. For example, business entities within fintech vertical including startups offering products and services related to payments, lending, insurance, microfinance, cryptocurrency, etc., banks, non-bank financial institutions, angel or venture capital funds interested in fintech vertical or the like may use such decentralized marketplace to offer goods and services and transact with one another. Users 302 may also contribute to extend the functionalities of the system 300 through developing, for example, specialized applications (Dapps) that may be used by some or all users within the fintech community. Examples of such applications include job-boards for fintech experts, decentralized messaging application and so on.

Figure 5:
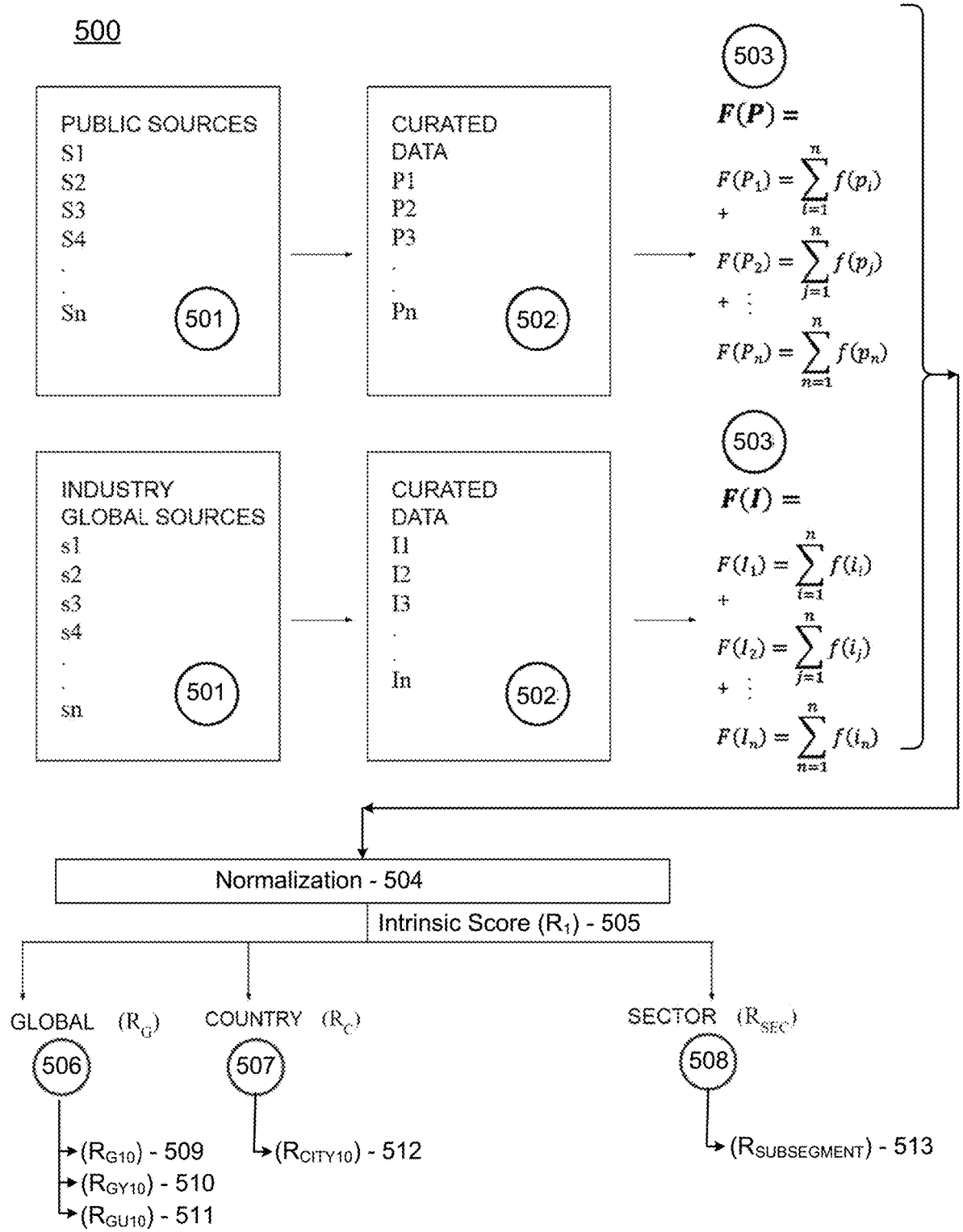
FIG. 5 is a schematic illustrating the generation of intrinsic scores and curated recommendations as well as bringing about machine learning processes according to an embodiment.

FIG. 5 (embodiment 500) illustrates how parameters from various sources 501 and 502 are manipulated as in 503 and then normalized as in 504 to produce intrinsic scores 505. Machine Learning processes ML1 are applied to the production of 505. Along with ML1, these intrinsic scores R enable the output of various types of curated recommendations or Top N lists. 506, 507 and 508 represent first order outputs, whereas 509, 510, 511, 512, and 513 represent second order outputs.

Figure 6:
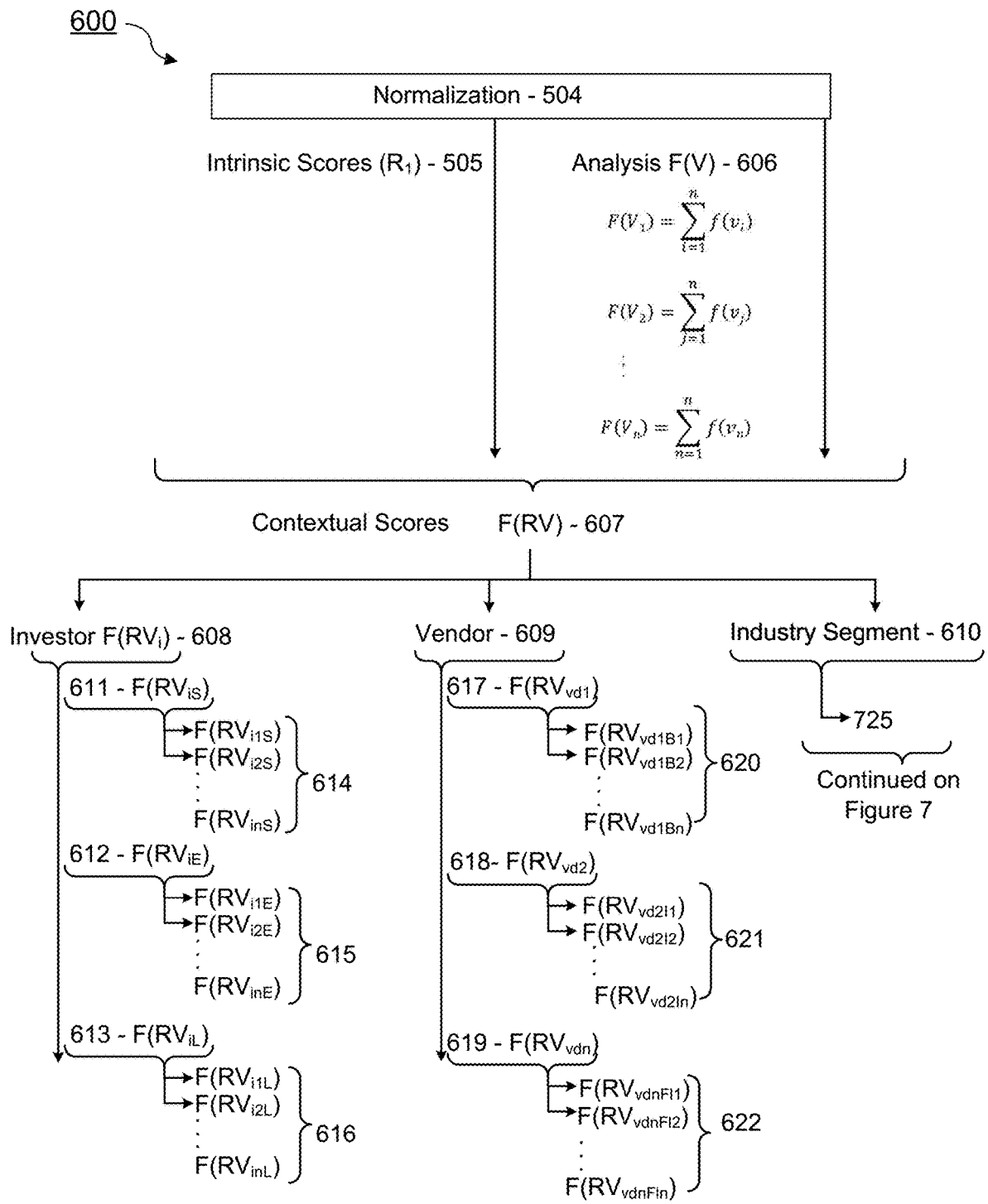
FIG. 6 is a schematic illustrating the generation of contextual scores and value chains or visual representations as well as bring about machine learning processes, according to an embodiment.

FIG. 6 (embodiment 600) illustrates how the intrinsic scores are combined with a particular analyst's analysis 606 of parameters from various sources 501 and 502 and with the application of ML2, contextual scores 607 can now be generated. 608 and 609 are outputs of the system which has ML3 embedded within the system. 611, 612, 613, 614, 615, 616, 617, 618, 619, 620, 621, and 622 represent relevancy scores which depend on a two-sided analysis of the component intrinsic and contextual scores.

Figure 7:
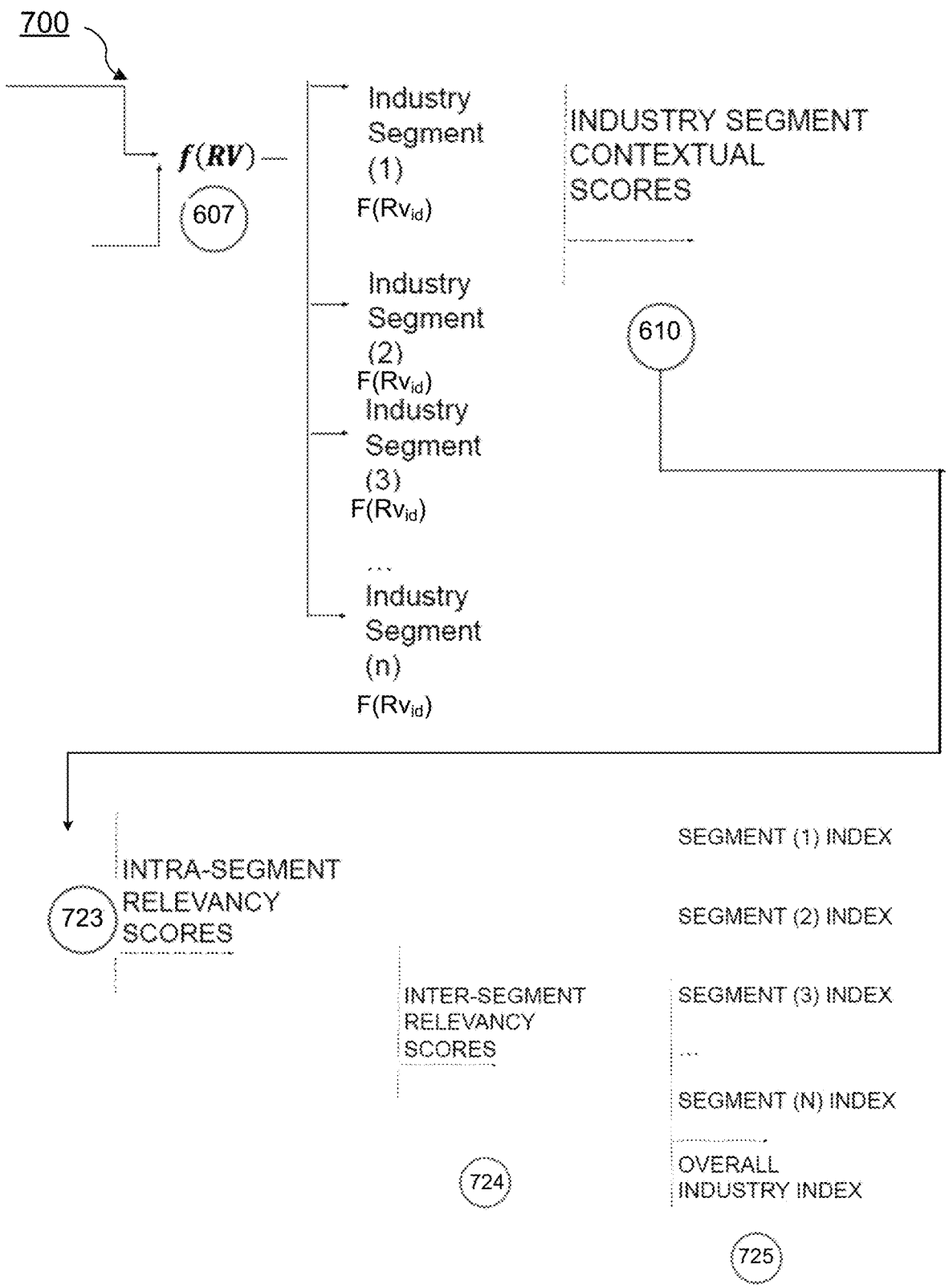
FIG. 7 is a schematic illustrating generation of relevancy scores and segment or industry indexes as well as bringing about machine learning processes, according to an embodiment.

FIG. 7 (embodiment 700) illustrates how contextual scores 610 for the industry or segments of the industry are transformed into intra-segment relevancy scores 723 with the application of ML4 and then further transformed into inter-segment relevancy scores 724 with the application of ML5. 725 represents the final production of representative sub-groups of the industry or industry segments or indexes.

Figure 8:
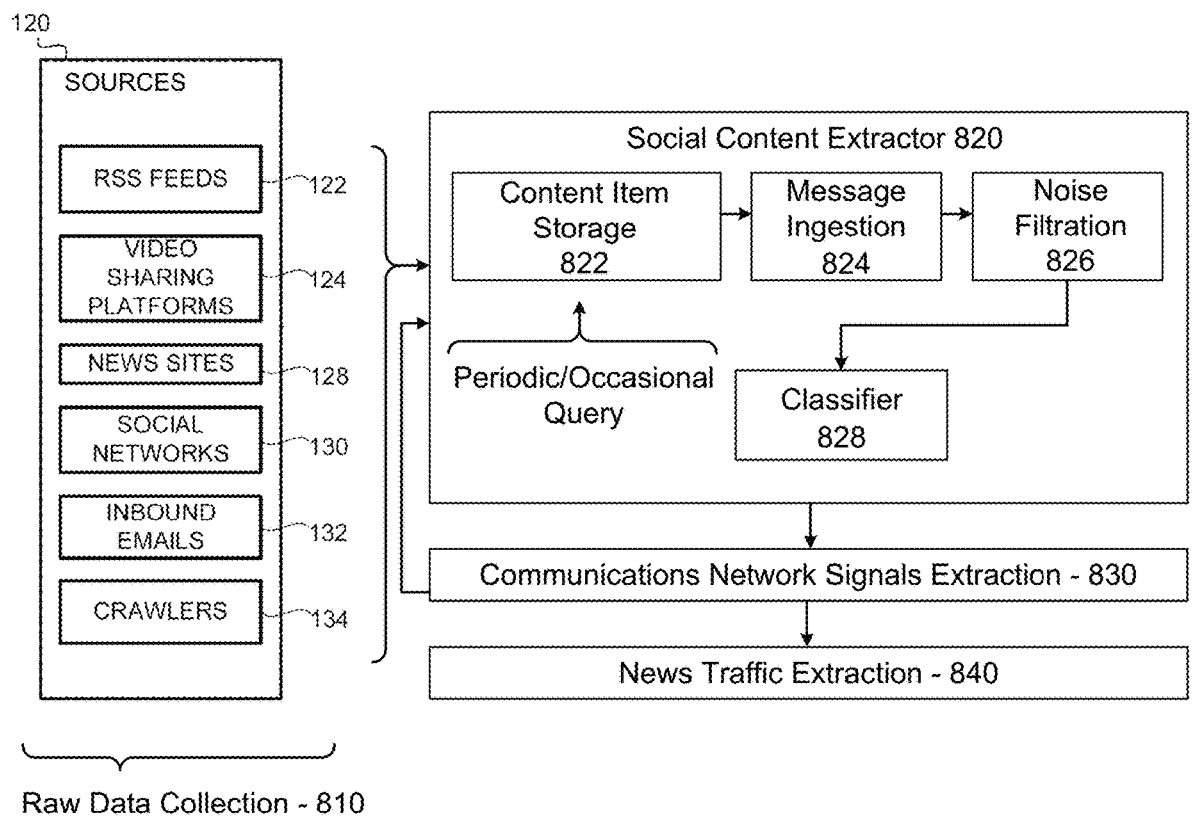
FIG. 8 is a diagram showing processes involved in content extraction from one or more communications networks, according to an embodiment.

FIG. 8 (embodiment 800) is a diagram for an apparatus for extraction of relevant content from communications networks, in accordance with an embodiment. As indicated in FIG. 8, sources 120 (e.g., RSS feeds 122, video sharing platforms 124, news sites 128, social networks hundred 30, inbound emails, 132, and/or crawlers (e.g., web crawlers) 134 may transmit or otherwise convey various parameters satisfying raw data collection parameters 810 to social content extractor 820. Sources 120 may transmit content via, for example, a communications network. Social content extractor 820 may store a corpus of character-limited messages. In particular embodiments, content items stored in content item storage 822 may comprise character-limited messages, such as messages comprising a length of between 100 characters and 400 characters. However, in other embodiments, character-limited messages may comprise lengths of, for example, less than 100 characters, for example, as well as lengths of greater than 400 characters, just to point out possible examples.

Content item storage 822 may be coupled to message ingestion 824, which may operate to parse or to extract, for example, keywords and/or key phrases from stored content items. In particular embodiments, message ingestion 824 may operate to evaluate messages from content item storage 822 that accord with one or more search terms provided, for example, by a user via a user interface of a client device. Notice filtration 826 may operate to apply one or more filters structures, so as to ensure, or at least reduce the possibility of stray (irrelevant) messages from being forwarded to classifier 828. As one example, notice filtration 826 may operate to filter messages comprising trivial content just as an example. For example, content items comprising messages that include simple greetings and/or passing references to particular topics may be filtered by way of notice filtration 826. Classifier 828 may receive output signals from notice filtration 826. Classifier 828 may operate to utilize one or more terms present in content items to determine whether content items pertain to fintech, for example, or any other technology field or that meet user-supplied search criteria, and claimed subject matter is not limited in this respect.

Output signals from content extractor 820 may be obtained by communications network signals extraction 830, which may, for example, obtain secondary content items that accord with the one or more relevant secondary search terms. For example, based, at least in part, on search results comprising, for example, references to electrically-powered automobile manufacturer "A" may bring about additional queries generated by communications network signals extraction 830 which may, for example, bring about references to electrically-powered automobile manufacturer "B," "C," and/or "D." In the embodiment of FIG. 8, news traffic extraction (840) may involve use of a more general-purpose Internet search engine, so as to obtain results relevant to secondary search terms from a corpus of documents available via the Internet. News traffic extraction 840 may operate to obtain search results from communications network signals extraction 830 and, for example, generate and/or prepare one or more signals to represent a report of entities that accord with one or more relevant secondary search terms.

Figure 9A:
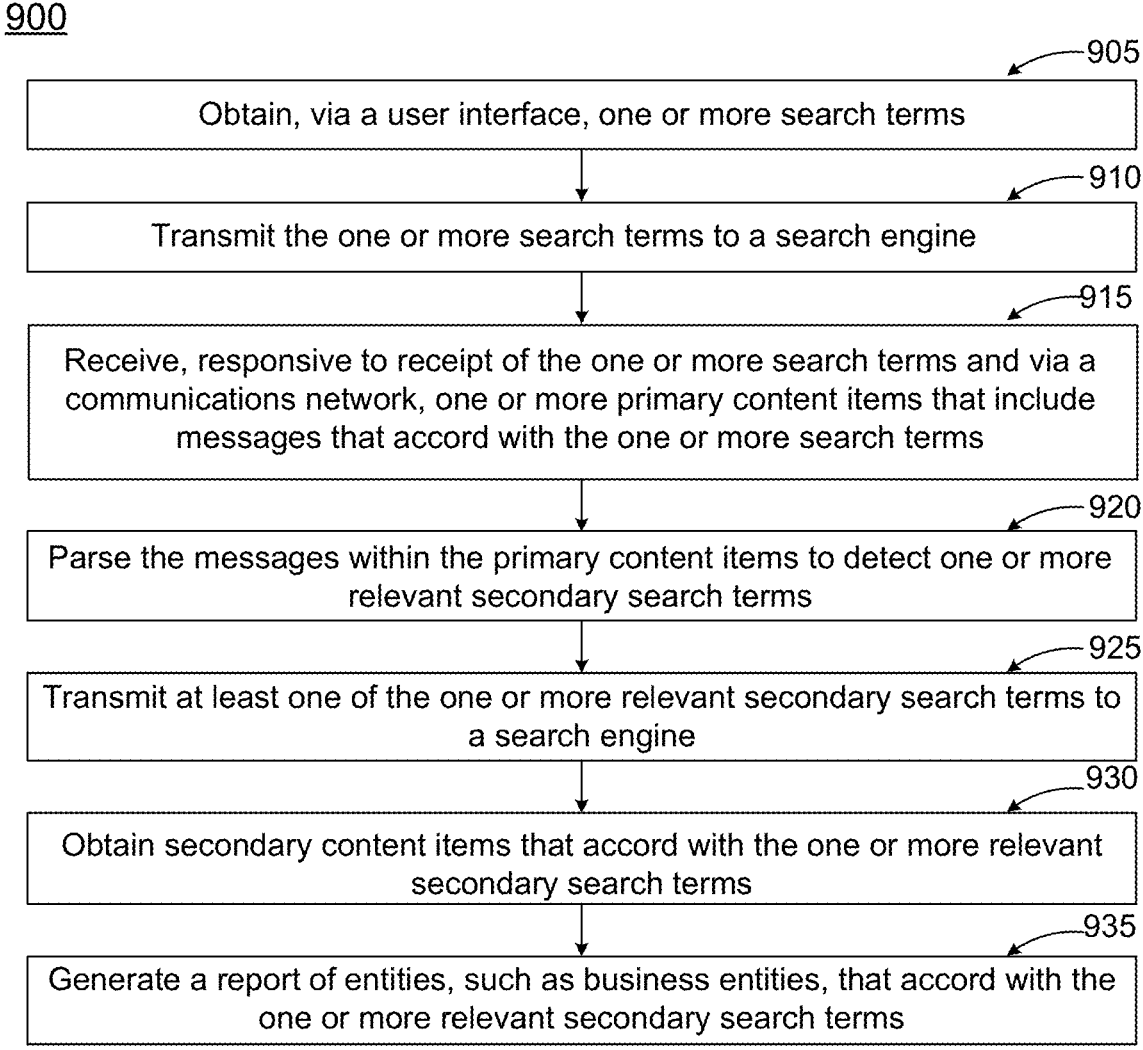
FIGS. 9A-9B are flowcharts for methods of extracting relevant content from communication networks, according to an embodiment.

FIG. 9A (embodiment 900) is a method of is a flowchart extracting relevant content from a communications networks, according to an embodiment. It should be noted that the disclosed embodiments, such as those of FIGS. 9A and 9B and others, are intended to embrace numerous variations, including methods that may include actions in addition to those depicted in the figures, actions performed in an order different than those depicted in the figures, as well as methods including fewer steps than those depicted. The method of FIG. 9A begins at 905, in which a client device, such as client device 150, obtains input signals responsive to a user interacting with a user interface of a client device. Interactions may result from a user operating with a client device during a browser-based session with, for example, an Internet website. At 910, the client device (e.g., client device 150) may transmit one or more search terms, such as search terms entered by a client at 905, to a search engine. In particular embodiments, search terms may be transmitted to a search engine, which operates to access one or more character-limited publishing applications, such as, for example, applications that limit or restrict published content items to message is including between 100 characters and 400 characters. In one instance, a character-limited publishing application may utilize hashtags, which identify topics that can be commented upon by users associated with various names, or "handles" associated with such users. Responsive to receiving one or more primary content items that include messages that accord with one or more search terms, such as search terms transmitted at 910, a computing device (e.g., a client computing device, server computing device, etc.,) may parse, such as at 920, messages within the various content items to detect one or more relevant secondary search terms.

In one example to illustrate 905-915, a user may form a query, such as a query relating to a popular manufacturer of electrically-powered automobiles, just to illustrate, which may be transmitted to a search engine at 910. It should be noted that a search engine may limit a number of queries, such as queries per hour, queries per day, and so forth, so as not to overload processing resources of an online publishing service. At 915, a search engine may return a number of primary content items, which may comprise messages including references that accord with the one or more search terms (e.g., manufacturers such as manufacturer "A" of electrically-powered automobiles).

920 may include parsing messages obtained at 915 to obtain relevant terms, such as, and just to continue with an example, names or other indicators of a popular manufacturer of electrically-powered automobiles. At 920, primary content items may be examined or "scrubbed," so as to obtain, for example, names of additional manufacturers of electrically-powered automobiles (e.g., manufacturers "B," "C," "D,"). At 925, other indicators may be utilized to form relevant secondary search terms, which may be submitted to a search engine. Such relevant secondary search terms, Just for the sake of illustration, a user may transmit (e.g., at 910) a name of a popular manufacture of automobiles.

At 930, responsive to transmission, such as at 925, of at least one of the one or more relevant secondary search terms to a search engine (e.g., terms related to manufacturers "B," "C," and "D"), secondary content items that accord with the one or more relevant secondary search terms are obtained. In an embodiment, secondary content items may include news articles, financial statements, tweets, etc., relating to manufacturers "B," "C," "D." At 935, responsive to obtaining content items relevant to the secondary search terms, and automated research system may generate a report of entities, such as business entities, which accord with the one or more relevant secondary search terms.

Figure 9B:
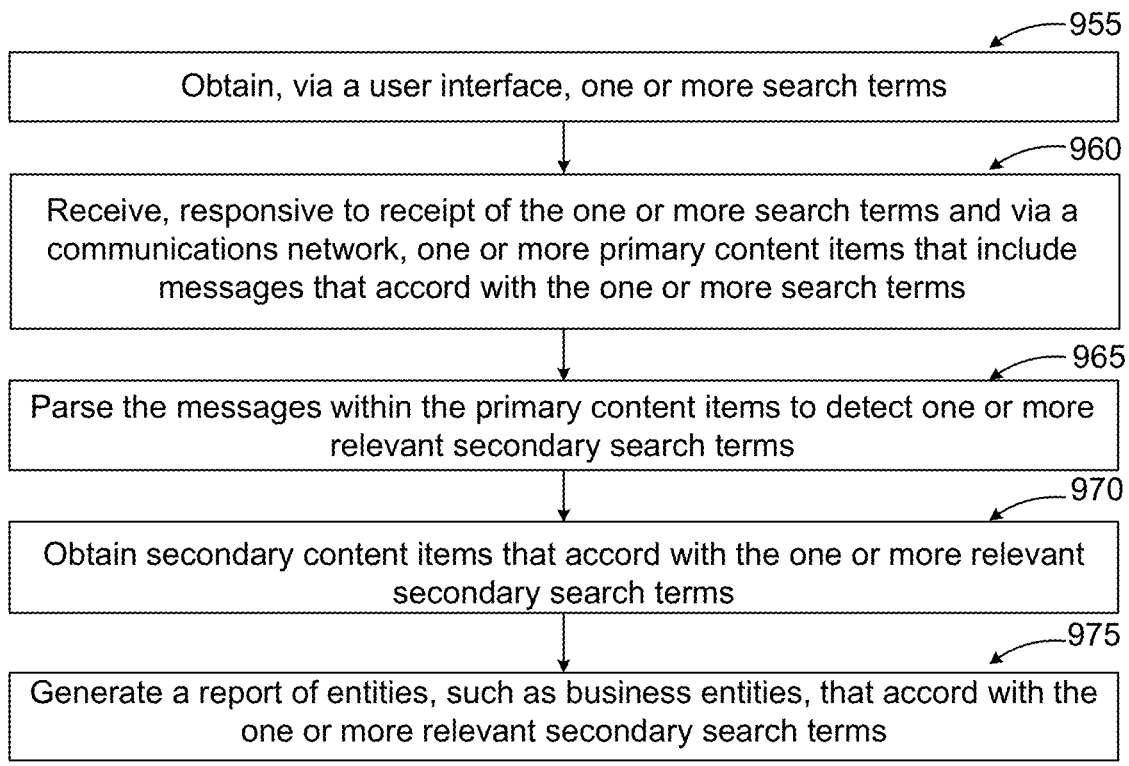

FIG. 9B (embodiment 950) is a method of is a flowchart extracting relevant content from a communications networks, according to an embodiment. The method of FIG. 9B begins at 955, which includes obtaining, via a user interface, one or more search terms. Search terms may include, for example, queries related to aspects and/or characteristics of financial technology business entities. 960 may include, responsive to receipt of the one or more search terms and utilizing a communications network, receiving one or more primary content items that include messages that accord with the one or more search terms. 960 may include receipt of search terms provided by a search engine that scans message traffic related to one or more character-limited online publishing services. 965 may include parsing messages within primary content items, such as primary content items received responsive to a search query, to detect one or more relevant secondary search terms. At 970, the method may continue with obtaining secondary content items that accord with the one or more relevant secondary search terms. At 975, the method may continue with generating report of entities, such as business entities, which accord with the one or more relevant secondary search terms.

Figure 10:
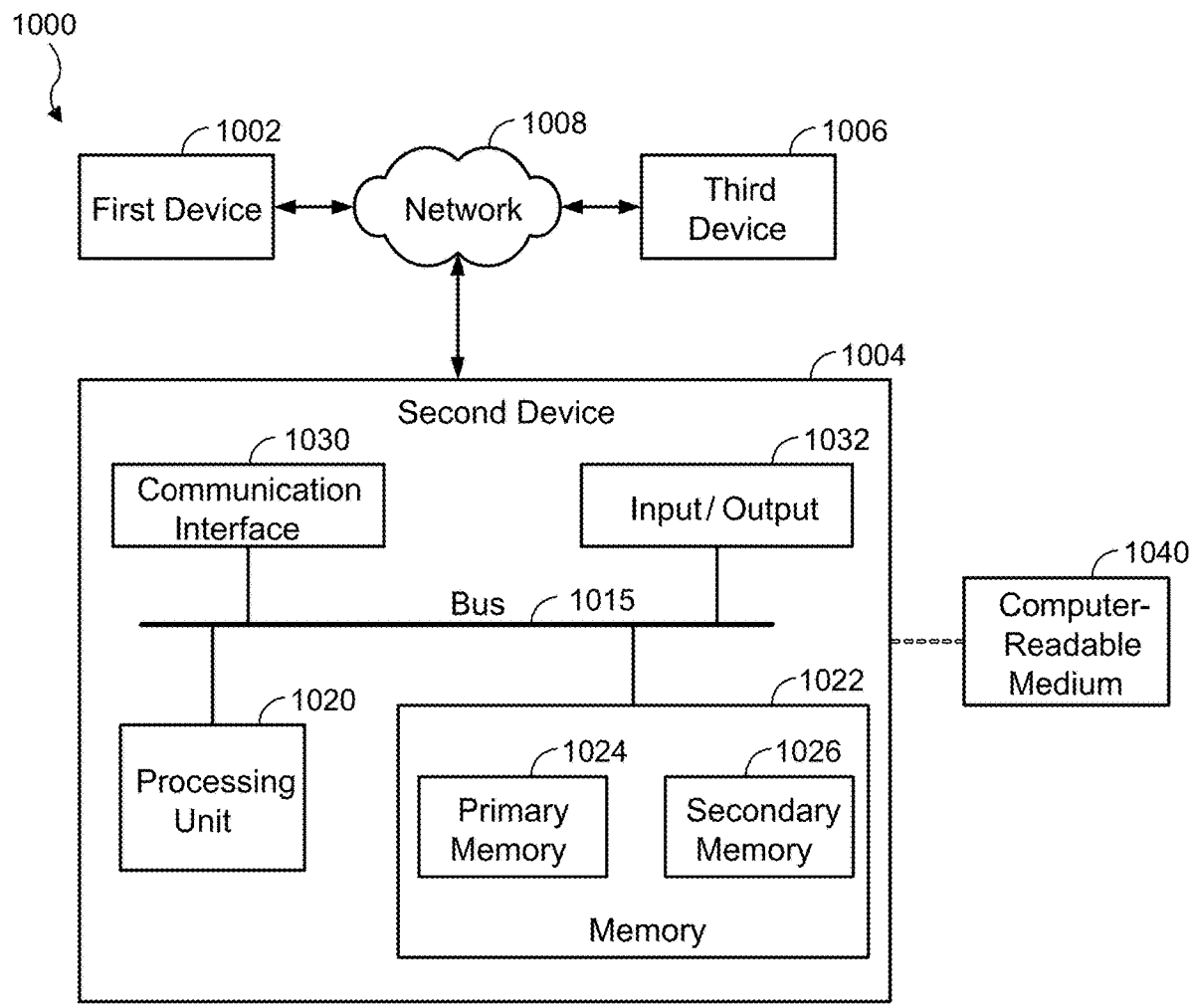
FIG. 10 is a diagram showing a computing environment, according to an embodiment.

FIG. 10 is a diagram showing a computing environment, according to an embodiment 1000. In the embodiment of FIG. 10, first and third devices 1002 and 1006 may be capable of rendering a graphical user interface (GUI) for a network device, such as server device 140 of FIG. 1, so that a subscriber utilizing a communicating device (e.g., a mobile cellular communications device, an IOT device, etc.) may engage in system use. Device 1004 may potentially serve a similar function in this illustration. Likewise, in FIG. 10, computing device 1002 ('first device' in FIG. 10) may interface with computing device 1004 ('second device' in FIG. 10), which may, for example, also comprise features of a client computing device and/or a server computing device, in an embodiment. Processor (e.g., processing device) 1020 and memory 1022, which may comprise primary memory 1024 and secondary memory 1026, may communicate by way of a communication interface 1030, for example. The term "computing device," or "computing resource" in the context of the present patent application, refers to a system and/or a device, such as a computing apparatus, which includes a capability to process (e.g., perform computations) and/or store digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se). Computing device 1004, as depicted in FIG. 10, is merely one example, and claimed subject matter is not limited in scope to this particular example.

In FIG. 10, computing device 1002 may provide one or more sources of executable computer instructions in the form of physical states and/or signals (e.g., stored in memory states), for example. Computing device 1002 may communicate with computing device 1004 by way of a network connection, such as via network 1008, for example. As previously mentioned, a connection, while physical, may be virtual while not necessarily being tangible. Although computing device 1004 of FIG. 10 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 1022 may comprise any non-transitory storage mechanism. Memory 1022 may comprise, for example, primary memory 1024 and secondary memory 1026, additional memory circuits, mechanisms, or combinations thereof may be used. Memory 1022 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 1022 may comprise one or more articles utilized to store a program of executable computer instructions. For example, processor 1020 may fetch executable instructions from memory and proceed to execute the fetched instructions. Memory 1022 may also comprise a memory controller for accessing device readable-medium 1040 that may carry and/or make accessible digital content, which may include code, and/or instructions, for example, executable by processor 1020 and/or some other device, such as a controller, as one example, capable of executing computer instructions, for example. Under direction of processor 1020, a non-transitory memory, such as memory cells storing physical states (e.g., memory states), comprising, for example, a program of executable computer instructions, may be executed by processor 1020 and able to generate signals to be communicated via a network, for example, as previously described. Generated signals may also be stored in memory, also previously suggested.

Memory 1022 may store electronic files and/or electronic documents, such as relating to one or more users, and may also comprise a machine-readable medium that may carry and/or make accessible content, including code and/or instructions, for example, executable by processor 1020 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

Processor 1020 may comprise one or more circuits, such as digital circuits, to perform at least a portion of a computing procedure and/or process. By way of example, but not limitation, processor 1020 may comprise one or more processors, such as controllers, micro-processors, microcontrollers, application specific integrated circuits, digital signal processors, programmable logic devices, field programmable gate arrays, the like, or any combination thereof. In various implementations and/or embodiments, processor 1020 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 10 also illustrates device 1004 as including a component 1032 operable with input/output devices, and communication bus 1015, for example, so that signals and/or states may be appropriately communicated between devices, such as device 1004 and an input device and/or device 1004 and an output device. A user may make use of an input device, such as a computer mouse, stylus, track ball, keyboard, and/or any other similar device capable of receiving user actions and/or motions as input signals. Likewise, for a device having speech to text capability, a user may speak to generate input signals. Likewise, a user may make use of an output device, such as a display, a printer, etc., and/or any other device capable of providing signals and/or generating stimuli for a user, such as visual stimuli, audio stimuli and/or other similar stimuli.

Particular embodiments of claimed subject matter are disclosed herein; however, it is to be understood that the disclosed implementations are merely exemplary of the disclosure, which may be embodied in various forms. Therefore, specific structural and functional details disclosed herein are not to be interpreted as limiting, but merely as a basis for the claims and as a representative basis for teaching one skilled in the art to variously employ the present disclosure in any appropriately detailed structure.

The terms "a" or "an," as used herein, are defined as one or more than one. The term "another," as used herein, is defined as at least a second or more.

The terms "including" and/or "having," as used herein, are defined as comprising (i.e., open transition). While only a few implementations of the present disclosure have been shown and described, it will be readily apparent to those skilled in the art that many changes and modifications may be made thereunto without departing from the spirit and scope of the present disclosure as described in the following claims. All patent applications and patents, both foreign and domestic, and other publications referenced herein are incorporated herein in their entireties to the full extent permitted by law. The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In particular embodiments, the processor may be part of a server, cloud server, client, network infrastructure, mobile computing platform, stationary computing platform, or other computing platforms. A processor may be any computational or processing device capable of executing program instructions, codes, binary instructions, and the like. The processor may be or may include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based, at least in part, on priority or any other order based, at least in part, on instructions provided in the program code. The processor, or any machine utilizing one, may include non-transitory memory that stores methods, codes, instructions and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache, and the like.

A processor may include one or more cores that may enhance speed and performance of a multiprocessor. In implementations, the process may be a dual core processor, quad core processors, other chip-level multiprocessor and the like that combine two or more independent cores (called a die). The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server, and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of programs across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs. The software program may be associated with a client that may include a file client, print client, domain client, internet client, intranet client and other variants such as secondary client, host client, distributed client, and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM, and the like. The processes, methods, program codes, instructions described herein and elsewhere may be executed by one or more of the network infrastructural elements. The methods and systems described herein may be adapted for use with any private, community, or hybrid cloud computing network or cloud computing environment, including those which involve features of software as a service (SaaS), platform as a service (PaaS), and/or infrastructure as a service (IaaS).

One or more aspects of the disclosure may be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system may be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other network types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be adapted to execute instructions in collaboration with other devices. The mobile devices may communicate with base stations interfaced with servers and adapted to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station. The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, stand-alone RAM disks, Zip drives, removable mass storage, off-line, and the like; other computer memory such as dynamic memory, static memory, read/write storage, mutable storage, read only random access, sequential access, location addressable, file addressable, content addressable, network attached storage, storage area network, bar codes, magnetic ink, and the like.

The methods and systems described herein may transform physical and/or intangible items from one state to another. The methods and systems described herein may also transform data representing physical and/or intangible items from one state to another. The elements described and depicted herein, including in flowcharts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, and the like. Furthermore, the elements depicted in the flowchart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. Variations and modifications are intended to fall within the scope of this disclosure. As such, the depiction and/or description of an order for various steps should not be understood to require a particular order of execution for those steps, unless required by a particular application, or explicitly stated or otherwise clear from the context. The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be adapted to process electronic signals. It will further be appreciated that one or more of the processes may be realized as a computer executable code capable of being executed on a machine-readable medium. As used herein, the term "module" may refer to computer program logic that is executed by a processor and which may be used to provide the specified functionality. A module can be implemented in hardware, firmware, and/or software being executed by a processor.

The computer executable code may be created using a structured programming language such as C, an object oriented programming language such as C++, a compiled programming language, such as Java, and/or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, responsive to execution by one or more computing devices, performs the steps thereof. In another aspect, the methods may be embodied in systems that perform the steps thereof and may be distributed across devices in a number of ways, or all of the functionalities may be integrated into a dedicated, standalone device or other hardware. In another aspect, the means for performing the steps associated with the processes described above may include any of the hardware and/or software described above. All such permutations and combinations are intended to fall within the scope of the present disclosure. While the disclosure has been disclosed in connection with the preferred implementations shown and described in detail, various modifications and improvements thereon will become readily apparent to those skilled in the art. Accordingly, the spirit and scope of the present disclosure is not to be limited by the foregoing examples but is to be understood in the broadest sense allowable by law. Recitations of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one skilled in the art to make and use what is considered presently to be the best mode thereof, those skilled in the art will understand and appreciate the existence of variations, combinations, and equivalents of the specific implementation, method, and examples herein. The disclosure should therefore not be limited by the above described implementation, method, and examples, but by all implementations and methods within the scope and spirit of the disclosure. While this disclosure contains many specifics, these should not be construed as limitations on the scope of the disclosure or of what may be claimed, but as descriptions of features specific to particular implementations of the disclosure. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Any element in a claim that does not explicitly state "means for" performing a specified function, or "step for" performing a specified function, is not to be interpreted as a "means" or "step" clause as specified in 35 U.S.C. § 112(f). In particular, any use of "step of" in the claims is not intended to invoke the provision of 35 U.S.C. § 112(f).

Persons skilled in the art may appreciate that numerous design configurations may be possible to enjoy the functional benefits of the inventive systems. Thus, given the wide variety of configurations and arrangements of implementations of the present disclosure the scope of the inventions is reflected by the breadth of the claims below rather than narrowed by the implementations described above. Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

What is claimed is:

1. A method comprising:
   obtaining, via a user interface, one or more search terms;
   receiving, responsive to transmitting the one or more search terms to a search entity, one or more primary content items that include a plurality of messages that accord with the one or more search terms;
   parsing the plurality of messages that accord with the one or more search terms to detect one or more relevant secondary search terms;
   obtaining secondary content items that accord with the one or more relevant secondary search terms; and
   generating signals to represent a report of entities that accord with the one or more relevant secondary search terms.

2. The method of claim 1, wherein the one or more primary content items correspond to character-limited content items from a character-limited publishing application.

3. The method of claim 2, wherein the character-limited content items comprise content items limited to messages, of the plurality of messages, which contain between 100 characters and 400 characters.

4. The method of claim 3, wherein the one or more relevant secondary search terms relate to terms extracted from the messages that contain the between the 100 characters and the 400 characters.

5. The method of claim 2, wherein obtaining the secondary content items is responsive to receiving output signals from a web crawler that operates to detect content items available via the Internet.

6. The method of claim 2, wherein the one or more secondary terms correspond to contextual elements of at least one of the plurality of parsed messages from the character-limited publishing application.

7. The method of claim 1, wherein the secondary content items are obtained from a real-simple-syndication feed or a news feed.

8. The method of claim 1, further comprising normalizing one or more quantities relating to the one or more secondary terms and/or relating to the one or more search terms.

9. An apparatus comprising:
   a computing platform comprising a processor coupled to at least one memory device to:
      obtain, via a user interface, one or more search terms;
      receive, responsive to transmitting the one or more search terms to a search entity, one or more primary content items that include a plurality of messages that accord with the one or more search terms;
      parse the plurality of messages that accord with the one or more search terms to detect one or more relevant secondary search terms;
      obtain secondary content items that accord with the one or more relevant secondary search terms; and generate signals to represent a report of entities that accord with the one or more relevant secondary search terms.

10. The apparatus of claim 9, wherein the one or more primary content items correspond to character-limited content items from a character-limited publishing application.

11. The apparatus of claim 10, wherein the character-limited content items comprise content items limited to messages, of the plurality of messages, which contain between 100 characters and 400 characters.

12. The apparatus of claim 11, wherein the one or more relevant secondary search terms relate to terms extracted from the messages that contain the between the 100 characters and the 400 characters.

13. The apparatus of claim 10, wherein obtaining the secondary content items is responsive to receiving output signals from a web crawler that operates to detect content items available via the Internet.

14. The apparatus of claim 10, wherein the one or more secondary terms correspond to contextual elements of at least one of the plurality of parsed messages from the character-limited publishing application.

15. The apparatus of claim 9, wherein the secondary content items are obtained from a real-simple-syndication feed or a news feed.

16. The apparatus of claim 9, further comprising normalizing one or more quantities relating to the one or more secondary terms and/or relating to the one or more search terms.

17. An article comprising:
a non-transitory storage medium having instructions stored thereon executable by a special-purpose computing platform to:
   obtain, via a user interface, one or more search terms;
   receive, responsive to transmitting the one or more search terms to a search entity, one or more primary content items that include a plurality of messages that accord with the one or more search terms;
   parse the plurality of messages that accord with the one or more search terms to detect one or more relevant secondary search terms;
   obtain secondary content items that accord with the one or more relevant secondary search terms; and
   generate signals to represent a report of entities that accord with the one or more relevant secondary search terms.

18. The article of claim 17, wherein obtaining the secondary content items is responsive to receiving output signals from a web crawler that operates to detect content items available via the Internet.

19. The article of claim 17, wherein the secondary content items are obtained from a real-simple-syndication feed or a news feed.

20. The article of claim 17, wherein the one or more secondary terms correspond to contextual elements of at least one of the plurality of parsed messages from a character-limited publishing application.

* * * * *